(12) United States Patent
Yoshioka

(10) Patent No.: US 6,420,067 B1
(45) Date of Patent: *Jul. 16, 2002

(54) MG-BASED NEGATIVE ELECTRODE ACTIVE MATERIAL, METHOD OF MANUFACTURING THE SAME, HYDROGEN-STORAGE ALLOY ELECTRODE, AND ALKALI SECONDARY BATTERY

(75) Inventor: Seishiro Yoshioka, Nara (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/345,416

(22) Filed: Jul. 1, 1999

(30) Foreign Application Priority Data

Jul. 6, 1998 (JP) .......................... 10-204245
Jun. 22, 1999 (JP) .......................... 11-175722

(51) Int. Cl.⁷ .................................................. H01M 4/58
(52) U.S. Cl. .................. 429/218.2; 429/231.6; 429/223; 429/226; 429/229; 420/900
(58) Field of Search .............................. 429/218.2, 223, 429/226, 229, 231.6; 420/900

(56) References Cited

U.S. PATENT DOCUMENTS 4,952,465 A * 8/1990 Harris et al. .................. 429/60
5,506,069 A 4/1996 Ovshinsky et al. ............ 429/59
6,214,492 B1 * 4/2001 Kono et al. ............... 429/218.2

FOREIGN PATENT DOCUMENTS

EP 0892451 1/1999
WO 95/34918 12/1995

OTHER PUBLICATIONS

T. Kohno et al., "The electrochemical characteristics of MG–Mg2Ni alloy electrode", 37ᵗʰ Battery Symposium of Japan, Tokyo, pp. 389–394 (1996).
Patent Abstracts of Japan, vol. 1998, No. 09,7/98 JP 10–102, 171.
Patent Abstracts of Japan, vol. 1998, No. 11, 9/98 for JP 10–147, 807.

* cited by examiner

Primary Examiner—Gabrielle Brouillette
Assistant Examiner—Angela J. Martin
(74) Attorney, Agent, or Firm—Fitzpatrick, Cella, Harper & Scinto

(57) ABSTRACT

An Mg-based alloy negative electrode active material used as a hydrogen storage alloy electrode of an alkali secondary battery includes an amorphous alloy containing Ni, Mg, Zn, and Zr and capable of electrochemically occluding and releasing hydrogen.

8 Claims, 1 Drawing Sheet

FIGURE
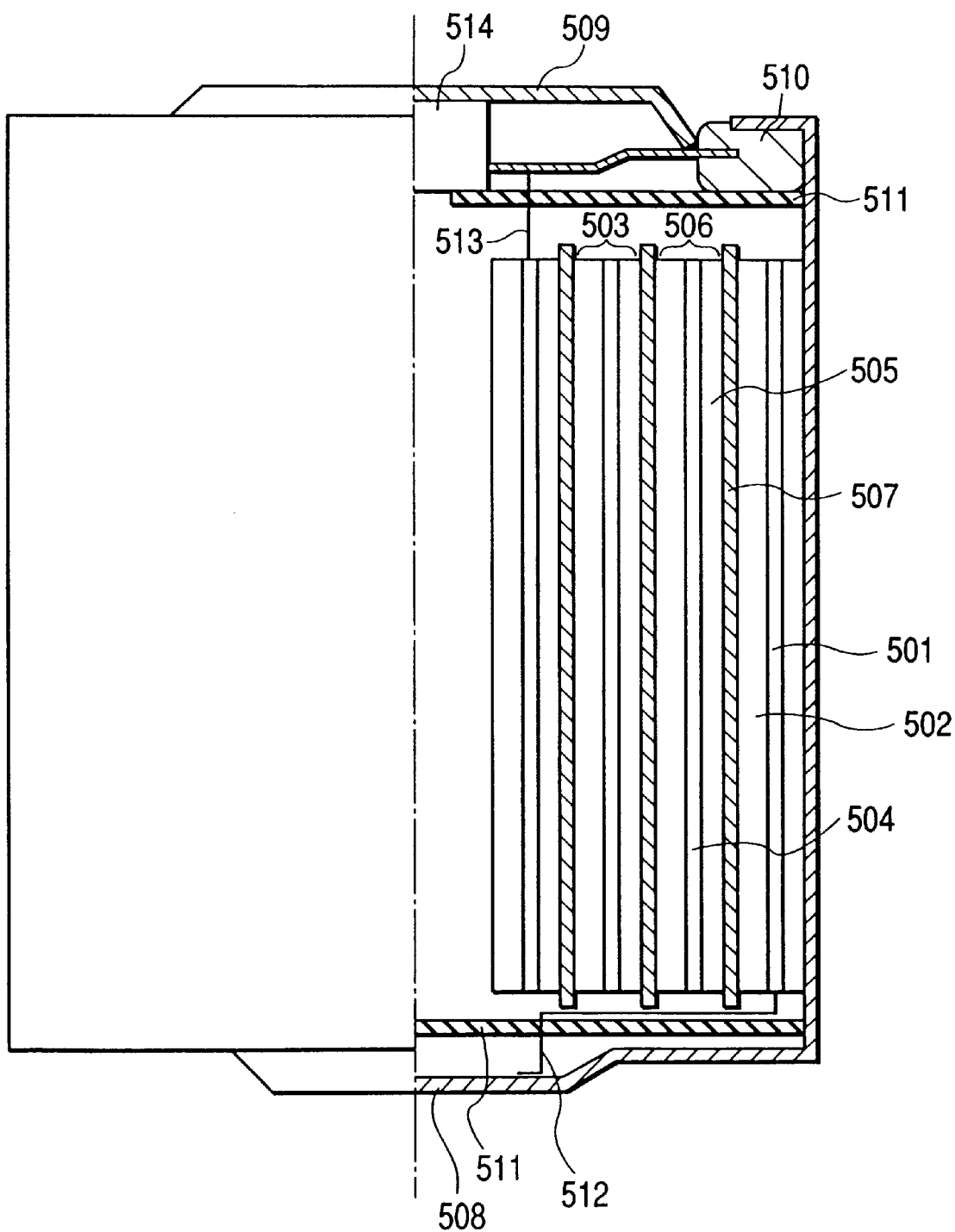

MG-BASED NEGATIVE ELECTRODE ACTIVE MATERIAL, METHOD OF MANUFACTURING THE SAME, HYDROGEN-STORAGE ALLOY ELECTRODE, AND ALKALI SECONDARY BATTERY

BACKGROUND OF THE INVENTION

1. Field of the Invention

The present invention relates to an Mg-based negative electrode active material, a method of manufacturing the same, a hydrogen storage alloy electrode, and an alkali secondary battery and, more particularly, a powder material suitable for a negative electrode active material as a main material of a secondary battery using an alkali as an electrolyte, a method of manufacturing the same, a negative electrode structure, and a secondary battery.

2. Related Background Art

Recently, $CO_2$ gas contained in the atmosphere is increasing, so the possibility of global warming by the greenhouse effect is pointed out. For example, a thermal electric power plant converts thermal energy obtained by burning fossil fuel into electric energy. Since, however, a large amount of $CO_2$ gas is exhausted by burning, it is difficult to newly build a thermal electric power plant. Therefore, so-called load leveling is proposed as effective use of electric power generated by a power generator such as a thermal electric power plant. This load leveling is to level the load by storing night power as dump power in a secondary battery installed in a general house and using the stored power in daytime during which the power consumption is large.

Also, the development of a high-energy-density secondary battery essential for electric automobiles which do not exhaust air pollutants, e.g., $CO_x$, $NO_x$, and hydrocarbons is being expected. Furthermore, for power supplies of portable apparatuses such as a book personal computer, wordprocessor, video camera, and portable telephone, the development of a small-sized, light-weight secondary battery is an urgent necessity.

Under the circumstances, a so-called Ni-hydride battery (to be referred to as an Ni-hydride battery hereinafter) has been put into practical use. This Ni-hydride battery is a high-capacity secondary battery using a hydrogen storage alloy which stores hydrogen at high density as the negative electrode of an alkali secondary battery.

As the hydrogen storage alloy, a misch metal-based alloy represented by $Mm(Ni-Co-Mn-Al)_5$, a transition metal-based alloy represented by Ti—Zr—Ni—V—Cr—Co—Mn, and a magnesium-nickel alloy such as $Mg_2Ni$ and MgNi have been studied. Of these alloys, a misch metal-based alloy and a transition metal-based alloy have been put to use in practice as the electrode material.

Unfortunately, the real capacities of both a misch metal-based alloy and a transition metal-based alloy are lower than their theoretical capacities, so further improvements of these alloys are being desired.

Mg is light in weight and has a large hydrogen storage amount (7.6 wt % for $MgH_2$). Therefore, if Mg can be applied to a battery as its negative electrode, a high-capacity battery is expected. However, Mg has a high hydrogen equilibrium dissociation temperature (the dissociation temperature is 287° C. when the hydrogen equilibrium dissociation pressure is 0.1 MPa) and hence has low hydrogen storage.releasing ability at room temperature. So, it is difficult to apply Mg to a battery.

As an electrode using a magnesium-nickel alloy, The 37th Battery Symposium in Japan, page 389 (1996) has announced that a high discharge capacity of 750 mAh/g is obtained in the first charge/discharge cycle by an electrode using an amorphous $Mg_2Ni$ alloy powder adjusted by mechanical grinding. However, when the charge/discharge cycle is repeated, the discharge capacity rapidly lowers, so no magnesium-nickel alloy electrode having a stable high discharge capacity is obtained.

To solve the above problems, the present inventors have made extensive studies and found a stable alkali secondary battery using a novel Mg-based alloy and having a high capacity and a long cycle life.

SUMMARY OF THE INVENTION

That is, it is an object of the present invention to provide an Ni-hydrogen alkali secondary battery which has a high capacity, suppresses the progress of fine powder formation, and hence has a long cycle life, by using an alloy powder containing Ni, Mg, Zn, and Zr and capable of electrochemically storage and releasing hydrogen as a negative electrode active material.

It is another object of the present invention to provide an Mg-based negative electrode active material for use in the abovementioned high-capacity, long-cycle-life secondary battery, a method of manufacturing the same, and a hydrogen storage alloy electrode.

It is still another object of the present invention to provide an Mg-based alloy negative electrode active material used in a hydrogen storage alloy electrode of an alkali secondary battery, comprising an amorphous alloy containing Ni, Mg, Zn, and Zr and capable of electrochemically storage and releasing hydrogen.

The ratio of the Ni weight to the total weight of Mg, Zn, and Zr is 0.2 to 3.0, preferably 0.4 to 2.6.

Letting $Mg(x).Zn(y).Zr(z)$ be the composition of Mg, Zn, and Zr except for Ni, it is desirable that 80<x<96 wt %, 1<y<15 wt %, and 0.01<z<5 wt %, preferably 85<x<92 wt %, 2<y<10 wt %, and 0.1<z <3 wt % (where x+y+z=100).

It is still another object of the present invention to provide a method of manufacturing an Mg-based alloy negative electrode active material, comprising the steps of placing powders of Ni, Mg, Zn, and Zr in a vessel, and adjusting the powders by mechanically mixing and grinding the powders.

The present invention includes a method in which the powders are mechanically mixed and ground by rotating the vessel and using the centrifugal force of the rotation.

The present invention includes a method in which the powders are adjusted by mechanically mixing and grinding the powders in an ambient selected from the group consisting of an inert gas and an inert gas containing hydrogen gas at a reduced pressure of 0.5 atm or less.

The present invention includes a method which further comprises a heating step of heating the powders at a temperature of 200 to 700° C. for 0.5 to 20 hr after the powders are adjusted by the mechanical mixing and grinding, and a cooling step of cooling the powders after the heating step.

It is still another object of the present invention to provide a hydrogen storage alloy electrode of an alkali secondary battery having a negative electrode active material layer, wherein the negative electrode active material layer is formed by using an Mg-based alloy negative electrode active material defined by the present invention.

It is still another object of the present invention to provide an alkali secondary battery comprising a negative electrode made of a hydrogen storage alloy electrode formed by using the abovementioned Mg-based alloy negative electrode active material, a positive electrode containing a metal oxide as a main constituent material, an alkali electrolyte, and a separator.

BRIEF DESCRIPTION OF THE DRAWING

FIGURE is a sectional view showing a cylindrical alkali secondary battery according to the present invention.

DETAILED DESCRIPTION OF THE PREFERRED EMBODIMENTS

A hydrogen storage alloy electrode of the present invention includes a negative electrode of an alkali secondary battery comprising the negative electrode containing an Mg-based hydrogen storage alloy as a main constituent material, a positive electrode containing a metal oxide as a main constituent material, an alkali electrolyte, and a separator, wherein a negative electrode active material of the negative electrode uses 'an amorphous alloy' containing Ni, Mg, Zn, and Zr as main components and capable of electrochemically storage and releasing hydrogen.

In the present invention, 'an amorphous alloy' is an alloy in which a metal powder contains an amorphous phase or is amorphous. Whether a metal powder contains an amorphous phase or is amorphous can be determined by the following method of analysis.

In an X-ray chart indicating the peak intensity as a function of the diffraction angle by X-ray diffraction analysis, a sharp peak of a crystal originally appears. However, if a metal powder contains an amorphous phase, the half width of the peak increases to form a broad peak. A complete amorphous metal powder has no X-ray diffraction peak at all. A radial distribution function is calculated from the result of X-ray diffraction analysis and indicates the distances and numbers of atoms from a certain atom. In this radial distribution function, a crystal having a fixed interatomic distance shows a sharp peak in a point at a specific distance. In the case of an amorphous metal powder, however, the density is high in a short distance close to the size of atom and is low in a long distance.

Also, in an electron diffraction pattern obtained by electron diffraction analysis, the spot pattern of a crystal changes to the pattern of an amorphous metal powder in the order of ring pattern→diffused ring pattern→halo pattern. A diffused ring pattern shows that the metal powder contains an amorphous phase, and a halo pattern shows that the metal powder is amorphous.

Furthermore, in DSC (Differential Scanning Calorimeter), a thermal peak resulting from crystallization is observed when a metal powder having an amorphous phase is heated (to, e.g., about 600° C.).

In order for a negative electrode alloy powder according to the present invention to have preferable electrode characteristics, the average grain size of the metal powder having an amorphous phase is preferably 0.1 to 50 $\mu$m, and more preferably 0.3 to 30 $\mu$m.

Also, the size of the crystallite calculated from the X-ray diffraction analysis of the metal powder is preferably 800 Å or less, and more preferably 600 Å or less. In the present invention, the size of a crystallite grain is determined by using the following Scherrer's equation from the half width of the peak of an X-ray diffraction curve and the diffraction angle obtained by using CuKα as an X-ray source:

$$Lc = 0.94\lambda/(\beta \cos \theta) \quad \text{(Scherrer's equation)}$$

where
- Lc: size of crystallite
- $\lambda$: wavelength of X-ray beam
- $\beta$: half width of peak
- $\theta$: diffraction angle By the use of fine crystal grains as described above, it is possible to allow smooth electrochemical reaction during charge/discharge and improve the discharge capacity. It is also possible to decrease strains produced by the entry and exit of hydrogen during charge/discharge and prolong the cycle life.

The present invention includes a negative electrode in which the composition (Mg(x).Zn(y).Zr(z)) except for Ni of the negative electrode active material satisfies 80<x<96 wt %, 1<y<15 wt %, and 0.01<z <5 wt % (where x+y+z=100).

The present invention includes a negative electrode in which the composition (Mg(x).Zn(y).Zr(z)) except for Ni of the negative electrode active material satisfies 85<x<92 wt %, 2<y<10 wt %, and 0.1<z <3 wt % (where x+y+z=100).

The present invention includes a negative electrode in which the negative electrode active material is made of an amorphous alloy containing Mg, Zn, Zr, and Ni having the above composition and capable of electrochemically storage and releasing hydrogen, and the ratio of the Ni weight to the (total weight of Mg+Zn+Zr) is 0.2 to 3.0, preferably 0.4 to 2.6.

A method of manufacturing an Mg-based alloy negative electrode active material of the present invention comprises the steps of placing a powder containing Ni, Mg, Zn, and Zr in a vessel which hardly reacts with this powder in an ambient selected from an inert gas or an inert gas containing hydrogen gas at a reduced pressure of 0.5 atm or less, mechanically mixing and grinding the powder by the centrifugal force of rotation by using an apparatus capable of rotating the vessel, and adjusting the resultant powder.

The method of manufacturing an Mg-based alloy negative electrode active material further comprises a heating step of heating the powder in the aforementioned ambient at a temperature of 200 to 700° C. for 0.5 to 20 hr, and a cooling step of cooling the powder to room temperature in the same ambient.

An alkali secondary battery of the present invention comprises a negative electrode containing an Mg-based hydrogen storage alloy as a main constituent material, a positive electrode containing a metal oxide as a main constituent material, an alkali electrolyte, and a separator, wherein the hydrogen storage alloy electrode having the Mg-based alloy negative electrode active material described above is used as the negative electrode.

The Mg-based alloy negative electrode active material, method of manufacturing the same, hydrogen storage alloy electrode, and alkali secondary battery using the same according to the present invention will be described in detail below.

Negative Electrode
Composition of Mg-based Alloy Negative Electrode Active Material The first condition of the Mg-based alloy negative electrode active material is as follows. As an Mg-based alloy powder containing Ni, Mg, Zn, and Zr as main components and serving as a negative electrode active material, Mg, Zn, and Zr powders are weighed such that the composition represented by (Mg(x).Zn(y).Zr(z)) of the Mg-based alloy powder containing Zn and Zr satisfies preferably 80<x<96 wt %, 1<y<15 wt %, and 0.01<z<5 wt %, and more preferably 85<x<92 wt %, 2<y<10 wt %, and 0.1<z <3 wt % (where x+y+z=100).

As the second condition, an Ni powder to be mixed in the Mg-based alloy powder to increase the activity of the negative electrode active material and increase the conductivity of the electrode is weighed as follows.

That is, the Ni powder is so weighed that in the Mg, Zn, and Zr powders and the Ni powder, the weight ratio of the Ni powder to the mixed powder (Mg(x).Zn(y).Zr(z)), i.e., the weight ratio of Ni powder/(Mg(x).Zn(y).Zr(z)) is preferably 0.2 to 3.0, more preferably 0.4 to 2.6. As these Mg, Zn, Zr, and Ni powders, commercially available metal powders having a grain size of 0.1 to 300 $\mu$m can be used.

Method of Manufacturing Mg-based Alloy Negative Electrode Active Material

A method of manufacturing a novel negative electrode active material by mixing the aforementioned weighed metal powders will be described below.

As an example, a method of manufacturing a total of about 33 g of an Mg-based negative electrode active material will be described. The total weight is about 33 g because apparatuses and equipment are readily available. To manufacture large amounts, large apparatuses and large amounts of equipment are installed.

A total of 10 g of Mg, Zn, and Zr powders meeting the above first condition and 23 g of an Ni powder meeting the above second condition are placed in a stainless steel (SUS) vessel containing Ar gas at 1 atm. The vessel is set in a planetary ball mill, and mechanical grinding is performed at a rotational speed of 800 to 3,000 rpm for 0.5 to 40 hr. The rotational speed and processing time need only be so set that the grain size of fine grains of the mixed metal powder is approximately 40 $\mu$m or less. If a large amount of grains whose grain size exceeds 40 $\mu$m exist, the area of the interface between the negative electrode active material and the electrolyte reduces. This makes activation as a negative electrode active material difficult and also reduces the battery capacity.

Instead of Ar gas at 1 atm, a so-called inert gas ambient or a reducing ambient can also be used. Examples are an He gas ambient at 1 atm and an Ar gas or He gas ambient at 1 atm containing 1 to 10 mol % of $H_2$ gas. An Ar gas ambient will be used as an example hereinafter. The processing can also be performed at a reduced pressure of 0.5 atm or less.

The processed mixed powder is again placed in the Ar gas ambient and heated to 200 to 700° C., preferably 250 to 650° C. for 0.5 to 20 hr. After that, the resultant powder is cooled to room temperature in the Ar gas ambient. Adjusting the heating temperature and heating time forms a powder containing a single component of Mg, Zn, Zr, and Ni, a single component whose grain size has grown because relatively small grains of the mixed component powder fuse to other grains, or a plurality of components. Smaller grains have higher activity and fuse more rapidly than larger grains.

As described above, the grain size and fused state of grains of the negative electrode active material can be adjusted by adjusting the rotating speed and time of the planetary ball mill or the temperature and time of the reheating. In this manner, the number of very fine grains having a grain size of about 1 $\mu$m or less obtained by mechanical grinding can be reduced. Such very fine grains having a grain size of about 1 $\mu$m or less have active corrosion reaction with an electrolyte. Therefore, reducing the number of very fine grains having a grain size of about 1 $\mu$m or less is effective to suppress the corrosion reaction of fine grains with the electrolyte, increase the battery capacity of the negative electrode active material, and prolong the cycle life. A sample manufactured as above was observed with an SEM (Scanning Electron Microscope). This sample was an active material powder having a grain size of about 0.5 to 40 $\mu$m and an average grain size of 3 to 30 $\mu$m.

In the formation of the Mg-based mixed powder, grains readily fuse if Mg is the only component, and Zn prevents this fusion. However, if the mixing amount of Zn is too large, grains tend to coarsen. Mixing Zr has an effect of preventing the formation of coarse grains and encouraging the formation of fine grains.

Accordingly, by optimally adjusting the mixing amounts of the powders of Zn and Zr to the powder of Mg, it is possible to obtain a relatively uniform grain size, allow easy formation of fine grains, decrease the rotational speed of the planetary ball mill, and reduce the processing time. This reduces the processing load of the planetary ball mill.

The weight ratio of the Ni powder to the (Mg(x).Zn(y).Zr(z)) mixed powder is determined as follows. Although the (Mg(x).Zn(y).Zr(z)) mixed powder achieves a function of storage and releasing hydrogen, the Ni powder has no such function of storage and releasing hydrogen. Therefore, if the weight ratio of the Ni powder is too large, the hydrogen storage amount reduces, and the battery capacity density lowers. On the other hand, if the weight ratio of the Ni powder is too small, the catalytic action of Ni reduces, and the activation of the hydrogen storage.releasing reaction of the (Mg(x).Zn(y).Zr(z)) mixed powder declines. This reduces the initial activation of the battery or reduces the battery capacity or the charge/discharge current density.

Accordingly, by optimizing the weight ratio of the Ni powder to the (Mg(x).Zn(y).Zr(z)) mixed powder, it is possible to improve the initial activation of the battery, increase the battery capacity and the charge/discharge current density, and improve the battery characteristics.

Method of Manufacturing Hydrogen Storage Alloy Electrode

A method of forming a hydrogen storage alloy electrode as an alkali battery negative electrode based on the manufacturing method of the present invention will be described below. That is, the Mg-based alloy negative electrode active material made of a mixed powder containing the Mg-based mixed powder obtained by the above manufacturing method and an Ni powder, a small amount of a fine Ni powder as a conductive assistant, and, e.g., slight amounts of polyvinylalcohol and water as binders are mixed to prepare a paste mixture. This paste mixture is filled in a sponge-like Ni porous body having a porosity of 95%. The resultant material is dried, pressed by a roller press, and cut into a predetermined size. An Ni lead wire is connected by spot welding to form a hydrogen storage alloy electrode as an alkali battery negative electrode.

Alkali Secondary Battery

An Ni-hydrogen alkali secondary battery based on the manufacturing method according to the present invention and using the above hydrogen storage alloy electrode as an alkali battery negative electrode will be described below.

The shapes of secondary batteries are generally a coin, cylinder, rectangle, and sheet. As an example, a cylindrical battery will be described below. A positive electrode, negative electrode, separator, collector electrode, and safety valve as basic constituent elements of a battery of any of the other shapes can be practiced by basically the same techniques as will be described below.

FIGURE is a sectional view showing a cylindrical alkali secondary battery of the present invention. The basic components are a negative electrode, positive electrode, electrolyte, separator, battery can, safety valve, and output terminal.

Referring to FIGURE, this secondary battery includes a negative active material layer 502 according to the present invention, a negative electrode 503 made of this negative electrode active material layer 502, a positive electrode active material layer 505, a positive electrode 506 made of this positive electrode active material layer 505, a positive electrode terminal (positive electrode can or positive electrode cap) 509, a separator.electrolyte 507, a gasket 510, a negative electrode collector 501, a positive electrode collector 504, an insulating plate 511, a negative electrode lead 512, a positive electrode lead 513, a safety valve 514, and a negative electrode can (negative electrode terminal) 508.

The individual constituent elements will be described below.

Similar to the positive electrodes of other alkali secondary batteries such as an Ni-Cd battery, nickel hydroxide can be used as the positive electrode active material of the positive electrode.

The electrolyte is generally prepared by adding 1.5 wt % of an aqueous LiOH alkali solution to 30 wt % of an aqueous KOH alkali solution. NaOH can also be added if necessary.

The separator has pores through which hydrogen ions can move and must be insoluble and stable in the electrolyte. Accordingly, suitable materials are glass, polyolefins such as polypropylene and polyethylene, fluorine resin, nonwoven fabric of e.g., polyimide, and micro-pore structure. A separator constructed of polyolefin or fluorine resin described above is preferably imparted hydrophilic nature in order to increase the wettability to the electrolyte. This process of giving hydrophilic nature can be easily performed by irradiation with plasma such as hydrogen plasma, oxygen plasma, or fluorine plasma, irradiation with ozone, corona discharge, or processing using chemicals.

It is also possible to use a metal oxide film having fine pores or a resin film formed by combining a plurality of metal oxides.

The material of the input and output terminals of the battery, which also serve as the battery can, i.e., the material of the terminals 508 and 509 shown in FIGURE is suitably a copper plate or stainless steel plate. In particular, a titanium-clad stainless steel plate, copper-clad stainless steel plate, or nickel-plated copper plate is often used.

The alkali battery includes the safety valve 514 as a safety device when the internal pressure of the battery rises. For example, rubber, spring, metal ball, or rupture foil can be used as this safety valve.

Examples of the material of the gasket 510 are a fluorine resin, polyamide resin, polysulfone resin, and various rubber materials. As a method of sealing the battery, it is possible to use, e.g., a glass sealing tube, adhesive, welding, or soldering, as well as "caulking" using the gasket.

Also, various organic resin materials and ceramics can be used as the material of the insulating plate 511 shown in FIGURE.

The present invention will be described in detail below by way of its examples. However, the present invention is not limited to these examples.

EXAMPLE 1

Preparation of Hydrogen Storage Alloy Powder

Various commercially available metal powders described below were prepared. These metal powders were placed in an SUS vessel whose internal atmosphere was replaced by an Ar ambient at 1 atm and were processed at 3,000 rpm for 20 hr by a planetary ball mill.

Prepared Metal Powders

1) Mg powder: purity 99.9%, 100 mesh, 52.7 g
2) Zn powder: purity 99.9%, 200 mesh, 3.4 g
3) Zr powder: purity 98%, average grain size 150 $\mu$m, 0.57 g
4) Ni powder: purity 99.9%, 350 mesh, 117.4 g The resultant mixed powder was heated at 250° C. for 2 hr in the Ar ambient at 1 atm and cooled to room temperature. This sample powder is A.

Following the same procedure as above, several different sample powders were formed by changing the weight ratios of the above metal powders. Table 1 shows these samples. Table 2 shows the weight ratios of the metal powders in these samples.

To evaluate the performance of battery negative electrodes, cylindrical alkali secondary batteries as shown in FIGURE were manufactured by using these samples. This manufacturing method will be described below.

Manufacture of Cylindrical Alkali Secondary Battery

Manufacture of Battery Electrode (Negative Electrode)

A battery negative electrode was manufactured as follows by using the sample powder A described above. The manufacture of this battery negative electrode using the sample powder A according to the present invention will be described below.

Water was added to 5 g of the sample powder A, 1 g of an Ni powder having an average grain size of 5 $\mu$m as a conductive assistant, and 0.15 g of polyvinyl alcohol, and these material were mixed to prepare a paste mixture. This paste mixture was filled in a sponge-like Ni porous body having an average pore size of 150 $\mu$m and a porosity of 95%. The resultant material was dried, pressed by a roller press, and cut into a predetermined size. An Ni lead wire was connected to this electrode by spot welding to obtain an electrode structure serving as the negative electrode of an alkali secondary battery.

Manufacture of Positive Electrode 15 g of a commercially available fine Ni hydroxide powder having an average grain size of 10 $\mu$m and 0.3 g of carboxymethylcellulose as a binder were mixed, and water was added to the mixture to prepare a paste. This paste was filled in a foamed Ni substrate having a thickness of 1.5 mm, a pore size of 200 $\mu$m, and a porosity of 95%, and the substrate was dried at 120° C. for 1 hr. The obtained electrode was pressed to adjust the thickness. The resultant electrode was cut into a predetermined size, and an Ni lead wire was connected to the electrode by spot welding, thereby obtaining an electrode structure serving as the positive electrode of the secondary battery.

Preparation of Electrolyte

An aqueous solution containing 6 M (mol/l) of potassium hydroxide and 1 M (mol/l) of lithium hydroxide was used.

Preparation of Separator

Polypropylene nonwoven fabric given hydrophilic nature was used.

Manufacture of Battery

The negative and positive electrodes described above were cylindrically, spirally wound with the separator interposed between them. The resultant cylindrical structure was inserted into a battery can. Leads were welded to portions serving as input and output terminals of the battery can and a battery cap. After the electrolyte was injected, the resultant structure was sealed by caulking to obtain a closed battery. To evaluate the capacity characteristics of the negative electrode, this battery was manufactured as a negative electrode capacity-regulated battery in which the capacity of the positive electrode was much larger than that of the negative electrode.

Evaluation of Characteristics of Battery

The characteristics of the battery manufactured as above were evaluated to verify the effect of the present invention. This evaluation of the battery characteristics will be described later.

EXAMPLE 2

To evaluate the effect of the content of Ni in the negative electrode active material according to the present invention, a sample powder was prepared by reducing only the content of Ni from that in Example 1. A battery for evaluation was manufactured following the same procedure as in Example 1 and subjected to the battery characteristic evaluation to be described later (the composition of the sample powder is shown in Table 1).

EXAMPLE 3

To evaluate the effect of the content of Ni in the negative electrode active material according to the present invention, a sample powder was prepared by increasing only the content of Ni from that in Example 1. A battery for evaluation was manufactured following the same procedure as in Example 1 and subjected to the battery characteristic evaluation to be described later (the composition of the sample powder is shown in Table 1).

Comparative Example 1

To evaluate the effect of the content of Ni in the negative electrode active material according to the present invention, a sample powder was prepared by further reducing only the content of Ni from that in Example 1. A battery for evaluation was manufactured following the same procedure as in Example 1 and subjected to the battery characteristic evaluation to be described later (the composition of the sample powder is shown in Table 1).

Comparative Example 2

To evaluate the effect of the content of Ni in the negative electrode active material according to the present invention, a sample powder was prepared by further increasing only the content of Ni from that in Example 1. A battery for evaluation was manufactured following the same procedure as in Example 1 and subjected to the battery characteristic evaluation to be described later (the composition of the sample powder is shown in Table 1).

EXAMPLE 4

To evaluate the effect of the content of Zn in the negative electrode active material according to the present invention, a sample powder was prepared by reducing only the content of Zn from that in Example 1. A battery for evaluation was manufactured following the same procedure as in Example 1 and subjected to the battery characteristic evaluation to be described later (the composition of the sample powder is shown in Table 1).

EXAMPLE 5

To evaluate the effect of the content of Zn in the negative electrode active material according to the present invention, a sample powder was prepared by increasing only the content of Zn from that in Example 1. A battery for evaluation was manufactured following the same procedure as in Example 1 and subjected to the battery characteristic evaluation to be described later (the composition of the sample powder is shown in Table 1).

Comparative Example 3

To evaluate the effect of the content of Zn in the negative electrode active material according to the present invention, a sample powder was prepared by further reducing only the content of Zn from that in Example 1. A battery for evaluation was manufactured following the same procedure as in Example 1 and subjected to the battery characteristic evaluation to be described later (the composition of the sample powder is shown in Table 1).

Comparative Example 4

To evaluate the effect of the content of Zn in the negative electrode active material according to the present invention, a sample powder was prepared by further increasing only the content of Zn from that in Example 1. A battery for evaluation was manufactured following the same procedure as in Example 1 and subjected to the battery characteristic evaluation to be described later (the composition of the sample powder is shown in Table 1).

EXAMPLE 6

To evaluate the effect of the content of Zr in the negative electrode active material according to the present invention, a sample powder was prepared by reducing only the content of Zr from that in Example 1. A battery for evaluation was manufactured following the same procedure as in Example 1 and subjected to the battery characteristic evaluation to be described later (the composition of the sample powder is shown in Table 1).

EXAMPLE 7

To evaluate the effect of the content of Zr in the negative electrode active material according to the present invention, a sample powder was prepared by increasing only the content of Zr from that in Example 1. A battery for evaluation was manufactured following the same procedure as in Example 1 and subjected to the battery characteristic evaluation to be described later (the composition of the sample powder is shown in Table 1).

Comparative Example 5

To evaluate the effect of the content of Zr in the negative electrode active material according to the present invention, a sample powder was prepared by further reducing only the content of Zr from that in Example 1. A battery for evaluation was manufactured following the same procedure as in Example 1 and subjected to the battery characteristic evaluation to be described later (the composition of the sample powder is shown in Table 1).

Comparative Example 6

To evaluate the effect of the content of Zr in the negative electrode active material according to the present invention, a sample powder was prepared by further increasing only the content of Zr from that in Example 1. A battery for evaluation was manufactured following the same procedure as in Example 1 and subjected to the battery characteristic evaluation to be described later (the composition of the sample powder is shown in Table 1).

Comparative Example 7

To evaluate the effect of the contents of Zn and Zr in the negative electrode active material according to the present invention, a sample powder not containing Zn and Zr was prepared. A battery for evaluation was manufactured following the same procedure as in Example 1 and subjected to the battery characteristic evaluation to be described later (the composition of the sample powder is shown in Table 1).

TABLE 1

| Sample name | Mg amount x (g) | Zn amount y (g) | Zr amount z (g) | Ni amount (g) | Σ (g) |
|---|---|---|---|---|---|
| Example 1 | 52.7 | 3.4 | 0.57 | 117.4 | 56.7 |
| Example 2 | 52.7 | 3.4 | 0.57 | 17 | 56.7 |
| Example 3 | 52.7 | 3.4 | 0.57 | 147.4 | 56.7 |
| Comparative Example 1 | 52.7 | 3.4 | 0.57 | 2.84 | 56.7 |
| Comparative Example 2 | 52.7 | 3.4 | 0.57 | 175.8 | 56.7 |
| Example 4 | 54.99 | 1.14 | 0.57 | 117.4 | 56.7 |
| Example 5 | 50.46 | 5.67 | 0.57 | 117.4 | 56.7 |
| Comparative Example 3 | 55.56 | 0.57 | 0.57 | 117.4 | 56.7 |
| Comparative Example 4 | 44.79 | 11.34 | 0.57 | 117.4 | 56.7 |
| Example 6 | 52.73 | 3.4 | 0.057 | 117.4 | 56.7 |
| Example 7 | 51.6 | 3.4 | 1.7 | 117.4 | 56.7 |
| Comparative Example 5 | 53.24 | 3.4 | 0.006 | 117.4 | 56.7 |
| Comparative Example 6 | 47.63 | 3.4 | 5.67 | 117.4 | 56.7 |
| Comparative Example 7 | 52.7 | 0 | 0 | 117.4 | 52.7 |

Note: Σ = x + y + z

TABLE 2

| | Ni weight ratio Ni/Σ ratio | Mg weight ratio x/Σ (wt %) | Zn weight ratio y/Σ (wt %) | Zr weight ratio z/Σ (wt %) |
|---|---|---|---|---|
| Example 1 | 2.1 | 93 | 6 | 1 |
| Example 2 | 0.3 | 93 | 6 | 1 |
| Example 3 | 2.6 | 93 | 6 | 1 |
| Comparative Example 1 | 0.05 | 93 | 6 | 1 |
| Comparative Example 2 | 3.1 | 93 | 6 | 1 |
| Example 4 | 2.1 | 97 | 2 | 1 |
| Example 5 | 2.1 | 89 | 10 | 1 |
| Comparative Example 3 | 2.1 | 98 | 1 | 1 |
| Comparative Example 4 | 2.1 | 79 | 20 | 1 |
| Example 6 | 2.1 | 93.9 | 6 | 0.1 |
| Example 7 | 2.1 | 91 | 6 | 3 |
| Comparative Example 5 | 2.1 | 93.99 | 6 | 0.01 |
| Comparative Example 6 | 2.1 | 84 | 6 | 10 |
| Comparative Example 7 | 2.2 | 1 | 0 | 0 |

Note: Σ = x + y + z (see Table 1)

Evaluation of Battery Characteristics

The characteristics of the batteries manufactured as described above were evaluated to verify the effect of the present invention.

EXAMPLE 8

Evaluation of Battery Characteristics

As the battery evaluation test, at room temperature the battery capacity was charged to 110% by a constant current at a rate of 10 hr (0.1 C). When a pause time of 0.5 hr elapsed after the charge, discharge was performed by a constant current at a rate of 5 hr (0.2 C). The stop voltage was set at 0.8 V, and the pause time after the discharge was set to 0.5 hr. In this manner, charge and discharge were repeated.

Table 3 shows the test results of battery characteristics. In Table 3, the discharge amounts in the 5th cycle from the initial charge/discharge of the batteries of these examples and comparative examples are compared as a measure of the ease of the initial activation of each battery and a measure of the battery capacity. Also, as a measure of the cycle life of each battery, the ratios of the discharge amounts in the 50th cycle to the discharge amounts in the 5th cycle of the batteries of these examples and comparative examples are compared as capacity holding rates.

TABLE 3

| | Initial activation Capacity in 5th cycle a (mAh/g) | Cycle life Capacity in 50th cycle a (mAh/g) | Capacity holding rate b/a |
|---|---|---|---|
| Example 1 | 600 | 580 | 0.97 |
| Example 2 | 300 | 250 | 0.83 |
| Example 3 | 500 | 450 | 0.90 |
| Comparative Example 1 | 20 | 80 | 4.00 |
| Comparative Example 2 | 330 | 220 | 0.67 |
| Example 4 | 350 | 240 | 0.69 |
| Example 5 | 400 | 300 | 0.75 |
| Comparative Example 3 | 280 | 170 | 0.61 |
| Comparative Example 4 | 250 | 120 | 0.48 |
| Example 6 | 350 | 450 | 1.29 |
| Example 7 | 120 | 400 | 3.33 |
| Comparative Example 5 | 100 | 220 | 2.20 |
| Comparative Example 6 | 20 | 100 | 5.00 |
| Comparative Example 7 | 10 | 1 | 0.10 |

Explanation of Battery Characteristic Evaluation Shown in Table 3

Battery Characteristics in Examples 1 to 3 and Comparative Examples 1 and 2 (Effect of Ni Weight Ratio)

An alkali battery A manufactured by using the sample powder A of Example 1 according to the present invention had a large initial discharge capacity and reduced the capacity little even when the charge/discharge cycle was repeated. For example, the discharge capacity after 50 cycles of the charge/discharge was 96.7% with reference to the discharge capacity in the 5th cycle from the start of the charge/discharge.

In contrast, the battery of Comparative Example 1 using the sample powder containing a smaller amount of Ni than that in the sample powder A was difficult to activate presumably because the catalytic action of Ni was little. The discharge capacity in the 5th cycle from the initial charge/discharge was about 20 mAh/g. This value was lower by about 3.3% than that in Example 1 according to the present invention.

The Ni amount in the battery of Example 2 was intermediate between the batteries of Example 1 and Comparative Example 1. The battery performance of this battery was also intermediate between them.

Conversely, the Ni amount in Comparative Example 2 was much larger than that in Example 1 according to the present invention, so the discharge capacity reduced. The discharge capacity in the 5th cycle from the initial charge/discharge was 55% of that in Example 1.

The Ni amount in the battery of Example 3 was intermediate between the batteries of Example 1 and Comparative Example 1. The battery performance of this battery was also intermediate between them.

As described above, the battery capacity reduced both when the Ni amount was too small and too large. Therefore, the ratio of the Ni amount to the amount of the rest of the negative electrode active material has a suitable range within which the battery capacity does not reduce. Letting a be the ratio of Ni fine grain weight/(total weight of Mg+Zn+Zr), a was preferably 0.2<a<3.0, and more preferably 0.4<a<2.6.

Battery Characteristics in Examples 4 and 5 and Comparative Examples 3 and 4 (Zn Addition Effect)

As shown in Table 3, the Zn amount in Comparative Example 4 was larger than that in Example 1 according to the present invention. Letting Mg(x).Zn(y).Zr(z) (where x, y, and z are wt % and x+y+z=100) be the composition of the negative electrode active material except for Ni, y/(x+y+z)= 0.06 in Example 1. However, y/(x+y+z)=0.2 in Comparative Example 4, i.e., the Zn amount was larger.

As can be seen from Table 3, the battery characteristics were such that the battery capacity was lower and the cycle life was shorter than in Example 1. To explicate this reason, the batteries of Example 1 and Comparative Example 4 were disassembled after 50 cycles of discharge, and SEM photographs of the negative electrode active materials were observed. Consequently, the negative electrode active material of the battery of Example 1 had a fine grain size of 2 to 25 $\mu$m and an average grain size of 12 $\mu$m, i.e., had a relatively uniform grain size. In contrast, the negative electrode active material of the battery of Comparative Example 4 had a fine grain size of 0.5 to 40 $\mu$m and an average grain size of about 26 $\mu$m. That is, the fine grain size largely varied, and many coarse grains existed probably because the amount of Zn was large. Presumably because the area of the interface between the negative electrode active material and the electrolyte was small, the battery of Comparative Example 4 had a smaller capacity and a shorter cycle life than those of the battery of Example 1.

In Example 5, the addition amount of Zn was intermediate between Example 1 and Comparative Example 4, and the battery performance was also intermediate between them. In Comparative Example 3, the addition amount of Zn was too small, so the Zn addition effect was little. In Example 4, the addition amount of Zn was increased from that in Comparative Example 3, and the battery performance was improved by the Zn addition effect.

As described above, the battery capacity reduced both when the Zn amount was too small and too large. Letting Mg(x).Zn(y).Zr(z) (where x, y, and z are wt % and x+y+z=100) be the composition of the negative electrode active material except for Ni, an addition amount y of Zn is preferably 1<y<15 wt %, and more preferably 2<y<10 wt %.

Battery Characteristics in Examples 6 and 7 and Comparative Examples 5 and 6 (Zr Addition Effect)

In Table 3, the amount of Zr in Comparative Example 6 was much larger than that in Example 1 according to the present invention. Letting Mg(x).Zn(y).Zr(z) (where x, y, and z are wt % and x+y +z=100) be the composition of the negative electrode active material except for Ni, z/(x+y+z)= 0.01 in Example 1, whereas z/(x+y+z)=0.1 in Comparative Example 6, i.e., the Zr amount was larger.

As can be seen from Table 3, the battery characteristics were such that the battery capacity was much lower than that in Example 1, and the battery was difficult to activate. To explicate this reason, the batteries of Example 1 and Comparative Example 6 were disassembled after 50 cycles of discharge, and SEM photographs of the negative electrode active materials were observed. Consequently, as described previously, the negative electrode active material of the battery of Example 1 had a fine grain size of 2 to 25 $\mu$m and an average grain size of 12 $\mu$m, i.e., had a relatively uniform grain size. In contrast, the negative electrode active material of the battery of Comparative Example 6 had a fine grain size of 0.1 to 27 $\mu$m and an average grain size of about 10 $\mu$m. That is, the fine grain size largely varied, and many very fine grains existed probably because the amount of Zr was large. Also, XRD analysis indicated that the surfaces of many fine grains were covered with a dense film of Zr oxide.

This dense Zr oxide film well transmits oxygen gas but has low transmittance to hydrogen gas. Therefore, the hydrogen storage amount did not increase probably because activation was difficult to perform by this negative electrode active material. Consequently, the battery of Comparative Example 6 was difficult to activate presumably because the capacity was lower than that of the battery of Example 1.

In Example 7, the Zr addition amount was intermediate between Example 1 and Comparative Example 6, and the battery capacity was also intermediate between them. In Comparative Example 5, no Zr addition effect was achieved because the addition amount of Zr was too small. In Example 6, the battery capacity was increased by increasing the Zr addition amount from than in Comparative Example 5. As described above, the battery capacity reduced both when the Zr amount was too small and too large. Letting Mg(x).Zn(y).Zr(z) (where x, y, and z are wt % and x+y+z=100) be the composition of the negative electrode active material except for Ni, an addition amount y of Zr is preferably 0.01<z<5 wt %, and more preferably 0.1<z<3 wt %.

In Comparative Example 7 shown in Table 3, neither Zn nor Zr was added, and the amounts of Mg and Ni were set to the same amounts in Example 1 according to the present invention. The battery characteristics were such that the initial discharge capacity was as high as 700 mAh/g, but the cycle life immediately deteriorated, i.e., the discharge capacity in the 5th cycle reduced to 10 mAh/g. This result is consistent with the report of the prior art (The 37th Battery Symposium in Japan), page 389, 1996).

From the foregoing, when small amounts of Zn and Zr are added to the Mg-based hydrogen storage alloy of the negative electrode to improve the battery characteristics, the battery characteristics deteriorate both when the addition amounts are too large and too small. That is, optimum values of the addition amounts exist to obtain the best battery characteristics.

More specifically, letting Mg(x).Zn(y).Zr(z) (where x, y, and z are wt % and x+y+z=100) be the composition of the negative electrode active material except for Ni, this composition ratio (Mg(x).Zn(y).Zr(z)) satisfies preferably 80<x<96 wt %, 1<y<15 wt %, and 0.01<z<5 wt %, and more preferably 85<x<92 wt %, 2<y<10 wt %, and 0.1<z <3 wt %.

Also, the weight ratio of the Ni powder to the (Mg(x).Zn (y).Zr(z)) mixed powder is preferably 0.2 to 3.0, and more preferably 0.4 to 2.6.

As has been described above, the present invention can provide an Ni-hydrogen alkali secondary battery which has a high capacity, suppresses the progress of fine powder formation, and has a long cycle life by using an alloy powder containing Ni, Mg, Zn, and Zr and capable of electrochemically storage and releasing hydrogen as a negative electrode active material.

The present invention can also provide an Mg-based negative electrode active material used in the abovementioned high-capacity, long-cycle-life secondary battery, a method of manufacturing the same, and a hydrogen storage alloy electrode.

What is claimed is:

1. An Mg-based alloy negative electrode active material used in a hydrogen storage alloy electrode of an alkali secondary battery consisting essentially of an amorphous alloy containing Ni, Mg, Zn, and Zr and capable of electrochemically storing and releasing hydrogen, wherein a ratio of an Ni weight to a total weight of Mg, Zn, and Zr is 0.2 to 3.0, and wherein letting Mg(x).Zn(y).Zr(z) be a composition of Mg, Zn, and Zr except for Ni, the weight distribution x:y:z satisfies the conditions:

80<x<96 wt %,

1<y<15 wt %, and 0.01<z<5 wt %(where x+y+z=100).

2. The material according to claim 1, wherein the ratio of Ni weight to the total weight of Mg, Zn, and Zr is 0.4 to 2.6.

3. The material according to claim 1, wherein the weight distribution x:y:z satisfies the conditions:

85<x<92 wt %,

2<y<10 wt %, and 0.1<z<3 wt %.

4. A method of manufacturing an Mg-based alloy negative electrode active material comprising the steps of:

placing powders of Ni, Mg, Zn, and Zr in a vessel; and adjusting said powders by mechanically mixing and grinding said powders.

5. The method according to claim 4, wherein said powders are adjusted by mechanically mixing and grinding said powders in an atmosphere selected from the group consisting of an inert gas and an inert gas containing hydrogen gas at a reduced pressure of not more than 0.5 atm.

6. The method according to claim 4 or 5, further comprising the steps of:

heating said powders at a temperature of 200 to 700° C. for 0.5 to 20 hr after said powders are adjusted by the mechanical mixing and grinding; and cooling said powders after said heating step.

7. A hydrogen storage alloy electrode of an alkali secondary battery having a negative electrode active material layer, wherein said negative electrode active material layer is formed by using an Mg-based alloy negative electrode active material according to claim 1.

8. An alkali secondary battery comprising:

a negative electrode made of a hydrogen storage alloy electrode formed by using an Mg-based alloy negative electrode active material according to claim 1;

a positive electrode containing a metal oxide as a main constituent material;

an alkali electrolyte; and a separator.

* * * * *

UNITED STATES PATENT AND TRADEMARK OFFICE
CERTIFICATE OF CORRECTION

| | |
|---|---|
| PATENT NO. | : 6,420,067 B1 |
| DATED | : July 16, 2002 |
| INVENTOR(S) | : Seishiro Yoshioka |

It is certified that error appears in the above-identified patent and that said Letters Patent is hereby corrected as shown below:

The title page should be deleted and replaced with the attached Title page to reflect change within the Abstract.

Column 1-Column 15, line 18 should be deleted and replaced with the attached pages showing Columns 1-15, line 18.

Signed and Sealed this

Fourteenth Day of June, 2005

JON W. DUDAS
*Director of the United States Patent and Trademark Office*

United States Patent
Yoshioka

(10) Patent No.: US 6,420,067 B1
(45) Date of Patent: *Jul. 16, 2002

(54) MG-BASED NEGATIVE ELECTRODE ACTIVE MATERIAL, METHOD OF MANUFACTURING THE SAME, HYDROGEN-STORAGE ALLOY ELECTRODE, AND ALKALI SECONDARY BATTERY

(75) Inventor: Seishiro Yoshioka, Nara (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/345,416

(22) Filed: Jul. 1, 1999

(30) Foreign Application Priority Data

Jul. 6, 1998 (JP) .......................... 10-204245
Jun. 22, 1999 (JP) .......................... 11-175722

(51) Int. Cl.[7] .......................... H01M 4/58
(52) U.S. Cl. .......................... 429/218.2; 429/231.6; 429/223; 429/226; 429/229; 420/900
(58) Field of Search .......................... 429/218.2, 223, 429/226, 229, 231.6; 420/900

(56) References Cited

U.S. PATENT DOCUMENTS 4,952,465 A * 8/1990 Harris et al. .......................... 429/60
5,506,069 A  4/1996 Ovshinsky et al. .......................... 429/59
6,214,492 B1 * 4/2001 Kono et al. .......................... 429/218.2

FOREIGN PATENT DOCUMENTS

EP  0892451  1/1999
WO  95/34918  12/1995

OTHER PUBLICATIONS

T. Kohno et al., "The electrochemical characteristics of MG–Mg2Ni alloy electrode", 37th Battery Symposium of Japan, Tokyo, pp. 389–394 (1996).
Patent Abstracts of Japan, vol. 1998, No. 09, 7/98 JP 10-102,171.
Patent Abstracts of Japan, vol. 1998, No. 11, 9/98 for JP 10-147, 807.

* cited by examiner

*Primary Examiner*—Gabrielle Brouillette
*Assistant Examiner*—Angela J. Martin
(74) *Attorney, Agent, or Firm*—Fitzpatrick, Cella, Harper & Scinto

(57) ABSTRACT

An Mg-based alloy negative electrode active material used as a hydrogen storage alloy electrode of an alkali secondary battery includes an amorphous alloy containing Ni, Mg, Zn, and Zr and is capable of electrochemically occluding and releasing hydrogen.

8 Claims, 1 Drawing Sheet

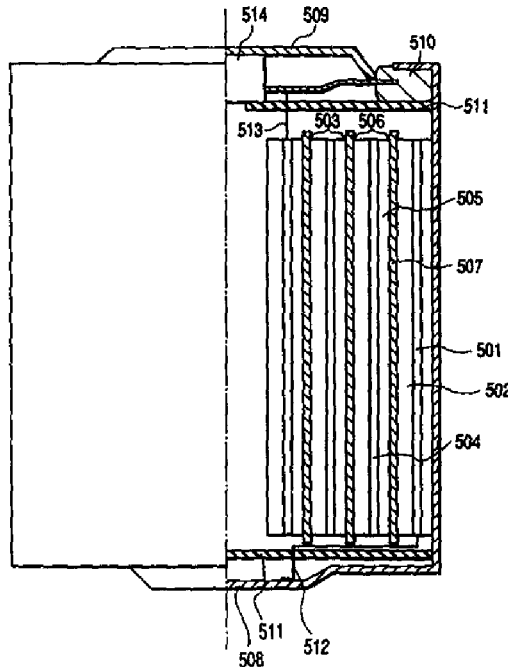

MG-BASED NEGATIVE ELECTRODE ACTIVE MATERIAL, METHOD OF MANUFACTURING THE SAME, HYDROGEN-STORAGE ALLOY ELECTRODE, AND ALKALI SECONDARY BATTERY

BACKGROUND OF THE INVENTION

1. Field of the Invention

The present invention relates to an Mg-based negative electrode active material, a method of manufacturing the same, a hydrogen storage alloy electrode, and an alkali secondary battery. More particularly, the invention relates to a powder material suitable for use in a negative electrode active material as a main material of a secondary battery using an alkali as an electrolyte, a method of manufacturing the same, a negative electrode structure, and a secondary battery.

2. Related Background Art

Recently, $CO_2$ gas contained in the atmosphere has increased; therefore, the possible effects of global warming due to the greenhouse effect have been noted. For example, a thermal electric power plant converts thermal energy obtained by burning fossil fuel into electric energy. Since, however, a large amount of $CO_2$ gas is exhausted by such burning, it is difficult to build new thermal electric power plants. Therefore, so-called load leveling has been proposed as an effective use of electric power generated by a power generator such as a thermal electric power plant. This load leveling levels the load by storing night power as dump power in a secondary battery installed in a home and using the stored power during the day when power consumption is high.

Also, the development of a high energy density secondary battery essential for electric automobiles which do not exhaust air pollutants, e.g., $CO_x$, $NO_x$, and hydrocarbons, is expected. Furthermore, for power supplies of portable apparatuses such as a book personal computers, wordprocessors, video cameras, and portable telephones, the development of small-sized, light-weight secondary batteries is an urgent necessity.

Under the circumstances, a so-called Ni-hydride battery (to be referred to as an Ni-hydride battery hereinafter) has been put into practical use. This Ni-hydride battery is a high capacity secondary battery using a hydrogen storage alloy which stores hydrogen at high density as the negative electrode of an-alkali secondary battery.

As the hydrogen storage alloy, a misch metal-based alloy represented by $Mm(Ni—Co—Mn—Al)_5$, a transition metal-based alloy represented by Ti—Zr—Ni—V—Cr—Co—Mn, and a magnesium-nickel alloy such as $Mg_2Ni$ and MgNi have been studied. Of these alloys, a misch metal-based alloy and a transition metal-based alloy have been put to use in practice as the electrode material.

Unfortunately, the real capacities of both a misch metal-based alloy and a transition metal-based alloy are lower than their theoretical capacities, so further improvements of these alloys are desired.

Mg is light in weight and has a large hydrogen storage amount (7.6 wt % for $MgH_2$). Therefore, if Mg can be applied to a battery as its negative electrode, a high capacity battery is expected. However, Mg has a high hydrogen equilibrium dissociation temperature (the dissociation temperature is 287° C. when the hydrogen equilibrium dissociation pressure is 0.1 MPa) and hence has low hydrogen storage/releasing ability at room temperature. So, it is difficult to apply Mg to a battery.

As an electrode using a magnesium-nickel alloy, the 37th Battery Symposium in Japan, p. 389 (1996), has announced that a high discharge capacity of 750 mAh/g is obtained in the first charge/discharge cycle by an electrode using an amorphous $Mg_2Ni$ alloy powder adjusted by mechanical grinding. However, when the charge/discharge cycle is repeated, the discharge capacity rapidly decreases, so no magnesium-nickel alloy electrode having a stable high discharge capacity is obtained.

To solve the above problems, the present inventors have made extensive studies and found a stable alkali secondary battery using a novel Mg-based alloy and having a high capacity and a long cycle life.

SUMMARY OF THE INVENTION

That is, it is an object of the present invention to provide an Ni-hydrogen alkali secondary battery which has a high capacity, suppresses the progress of fine powder formation, and hence has a long cycle life, by using an alloy powder containing Ni, Mg, Zn, and Zr and which is capable of electrochemically storing and releasing hydrogen as a negative electrode active material.

It is another object of the present invention to provide an Mg-based negative electrode active material for use in the above-mentioned high capacity, long cycle life secondary battery, a method of manufacturing the same, and a hydrogen storage alloy electrode.

It is still another object of the present invention to provide an Mg-based alloy negative electrode active material used in a hydrogen storage alloy electrode of an alkali secondary battery comprising an amorphous alloy containing Ni, Mg, Zn, and Zr and which is capable of electrochemically storing and releasing hydrogen.

The ratio of the Ni weight to the total weight of Mg, Zn, and Zr is 0.2 to 3.0, preferably 0.4 to 2.6.

Letting $Mg(x).Zn(y).Zr(z)$ be the composition of Mg, Zn, and Zr except for Ni, it is desirable that $80<x<96$ wt %, $1<y<15$ wt %, and $0.01<z<5$ wt %, preferably $85<x<92$ wt %, $2<y<10$ wt %, and $0.1<z<3$ wt % (where $x+y+z=100$).

It is still another object of the present invention to provide a method of manufacturing an Mg-based alloy negative electrode active material comprising the steps of placing powders of Ni, Mg, Zn, and Zr in a vessel, and adjusting the powders by mechanically mixing and grinding the powders.

The present invention includes a method in which the powders are mechanically mixed and ground by rotating the vessel and using the centrifugal force of the rotation.

The present invention includes a method in which the powders are adjusted by mechanically mixing and grinding the powders in an atmosphere selected from the group consisting of an inert gas and an inert gas containing hydrogen gas at a reduced pressure of 0.5 atm or less.

The present invention includes a method which further comprises a heating step of heating the powders at a temperature of 200 to 700° C. for 0.5 to 20 hours after the powders are adjusted by the mechanical mixing and grinding and a cooling step of cooling the powders after the heating step.

It is still another object of the present invention to provide a hydrogen storage alloy electrode of an alkali secondary battery having a negative electrode active material layer, wherein the negative electrode active material layer is formed using an Mg-based alloy negative electrode active material defined by the present invention.

It is still another object of the present invention to provide an alkali secondary battery comprising a negative electrode made of a hydrogen storage alloy electrode formed using the above-mentioned Mg-based alloy negative electrode active material, a positive electrode containing a metal oxide as a main constituent material, an alkali electrolyte, and a separator.

BRIEF DESCRIPTION OF THE DRAWING

Figure is a sectional view showing a cylindrical alkali secondary battery according to the present invention.

DETAILED DESCRIPTION OF THE PREFERRED EMBODIMENTS

A hydrogen storage alloy electrode of the present invention includes a negative electrode of an alkali secondary battery comprising the negative electrode containing an Mg-based hydrogen storage alloy as a main constituent material, a positive electrode containing a metal oxide as a main constituent material, an alkali electrolyte, and a separator, wherein a negative electrode active material of the negative electrode uses "an amorphous alloy" containing Ni, Mg, Zn, and Zr as main components and is capable of electrochemically storing and releasing hydrogen.

In the present invention, "an amorphous alloy" is an alloy in which a metal powder contains an amorphous phase or is amorphous. Whether a metal powder contains an amorphous phase or is amorphous can be determined by the following method of analysis.

In an x-ray chart indicating the peak intensity as a function of the diffraction angle by x-ray diffraction analysis, a sharp peak of a crystal originally appears. However, if a metal powder contains an amorphous phase, the half width of the peak increases to form a broad peak. A complete amorphous metal powder has no x-ray diffraction peak at all. A radial distribution function is calculated from the result of x-ray diffraction analysis and indicates the distances and numbers of atoms from a certain atom. In this radial distribution function, a crystal having a fixed interatomic distance shows a sharp peak in a point at a specific distance. In the case of an amorphous metal powder, however, the density is high in a short distance close to the size of the atom and is low in a long distance.

Also, in an electron diffraction pattern obtained by electron diffraction analysis, the spot pattern of a crystal changes to the pattern of an amorphous metal powder in the order of ring pattern→diffused ring pattern→halo pattern. A diffused ring pattern shows that the metal powder contains an amorphous phase, and a halo pattern shows that the metal powder is amorphous.

Furthermore, in DSC (Differential Scanning Calorimetry), a thermal peak resulting from crystallization is observed when a metal powder having an amorphous phase is heated (to, e.g., about 600° C.).

In order for a negative electrode alloy powder according to the present invention to have preferable electrode characteristics, the average grain size of the metal powder having an amorphous phase is preferably 0.1 to 50 μm, and more preferably 0.3 to 30 μm.

Also, the size of the crystallite calculated from the x-ray diffraction analysis of the metal powder is preferably 800 Å or less, and more preferably 600 Å or less. In the present invention, the size of a crystallite grain is determined using the following Scherrer's equation from the half width of the peak of an x-ray diffraction curve and the diffraction angle obtained using CuKα as an x-ray source:

$$Lc = 0.94\lambda/(\beta \cos \theta) \quad \text{(Scherrer's equation)}$$

where $Lc$: size of crystallite
$\lambda$: wavelength of x-ray beam
$\beta$: half width of peak
$\theta$: diffraction angle By the use of fine crystal grains as described above, it is possible to allow smooth electrochemical reaction during charge/discharge and improve the discharge capacity. It is also possible to decrease strains produced by the entry and exit of hydrogen during charge/discharge and prolong the cycle life.

The present invention includes a negative electrode in which the composition $(Mg(x).Zn(y).Zr(z))$ except for Ni of the negative electrode active material satisfies $80 < x < 96$ wt %, $1 < y < 15$ wt %, and $0.01 < z < 5$ wt % (where $x+y+z=100$).

The present invention includes a negative electrode in which the composition $(Mg(x).Zn(y).Zr(z))$ except for Ni of the negative electrode active material satisfies $85 < x < 92$ wt %, $2 < y < 10$ wt %, and $0.1 < z < 3$ wt % (where $x+y+z=100$).

The present invention includes a negative electrode in which the negative electrode active material is made of an amorphous alloy containing Mg, Zn, Zr, and Ni having the above composition and is capable of electrochemically storing and releasing hydrogen, and the ratio of the Ni weight to the (total weight of Mg+Zn+Zr) is 0.2 to 3.0, preferably 0.4 to 2.6.

A method of manufacturing an Mg-based alloy negative electrode active material of the present invention comprises the steps of placing a powder containing Ni, Mg, Zn, and Zr in a vessel which minimally, if at all, reacts with this powder in an atmosphere selected from an inert gas or an inert gas containing hydrogen gas at a reduced pressure of 0.5 atm or less, mechanically mixing and grinding the powder by the centrifugal force of rotation using an apparatus capable of rotating the vessel, and adjusting the resultant powder.

The method of manufacturing an Mg-based alloy negative electrode active material further comprises a heating step of heating the powder in the aforementioned atmosphere at a temperature of 200 to 700° C. for 0.5 to 20 hours, and a cooling step of cooling the powder to room temperature in the same atmosphere.

An alkali secondary battery of the present invention comprises a negative electrode containing an Mg-based hydrogen storage alloy as a main constituent material, a positive electrode containing a metal oxide as a main constituent material, an alkali electrolyte, and a separator, wherein the hydrogen storage alloy electrode having the Mg-based alloy negative electrode active material described above is used as the negative electrode.

The Mg-based alloy negative electrode active material, method of manufacturing the same, hydrogen storage alloy electrode, and alkali secondary battery using the same according to the present invention will be described in detail below.

Negative Electrode

Composition of Mg-Based Alloy Negative Electrode Active Material

The first condition of the Mg-based alloy negative electrode active material is as follows. As an Mg-based alloy powder containing Ni, Mg, Zn, and Zr as main components and serving as a negative electrode active material, Mg, Zn, and Zr powders are weighed such that the composition represented by $(Mg(x).Zn(y).Zr(z))$ of the Mg-based alloy powder containing Zn and Zr satisfies preferably $80<x<96$ wt %, $1<y<15$ wt %, and $0.01<z<5$ wt %, and more preferably $85<x<92$ wt %, $2<y<10$ wt %, and $0.1<z<3$ wt % (where $x+y+z=100$).

As the second condition, an Ni powder to be mixed in the Mg-based alloy powder to increase the activity of the negative electrode active material and increase the conductivity of the electrode is weighed as follows.

That is, the Ni powder is so weighed that in the Mg, Zn, and Zr powders and the Ni powder, the weight ratio of the Ni powder to the mixed powder $(Mg(x).Zn(y).Zr(z))$, i.e., the weight ratio of Ni powder/$(Mg(x).Zn(y).Zr(z))$ is preferably 0.2 to 3.0, more preferably 0.4 to 2.6. As these Mg, Zn, Zr, and Ni powders, commercially available metal powders having a grain size of 0.1 to 300 μm can be used.

Method of Manufacturing Mg-Based Alloy Negative Electrode Active Material

A method of manufacturing a novel negative electrode active material by mixing the aforementioned weighed metal powders will be described below.

As an example, a method of manufacturing a total of about 33 g of an Mg-based negative electrode active material will be described. The total weight is about 33 g because apparatuses and equipment are readily available. To manufacture large amounts, large apparatuses and much equipment need be installed.

A total of 10 g of Mg, Zn, and Zr powders meeting the above first condition and 23 g of an Ni powder meeting the above second condition are placed in a stainless steel (SUS) vessel containing Ar gas at 1 atm. The vessel is set in a planetary ball mill, and mechanical grinding is performed at a rotational speed of 800 to 3,000 rpm for 0.5 to 40 hours. The rotational speed and processing time need only be so set that the grain size of fine grains of the mixed metal powder is approximately 40 μm or less. If a large amount of grains whose grain size exceeds 40 μm exist, the area of the interface between the negative electrode active material and the electrolyte is reduced. This makes activation as a negative electrode active material difficult and also reduces the battery capacity.

Instead of Ar gas at 1 atm, a so-called inert gas atmosphere or a reducing atmosphere can also be used. Examples are an He gas atmosphere at 1 atm and an Ar gas or He gas atmosphere at 1 atm containing 1 to 10 mol % of $H_2$ gas. An Ar gas atmosphere will be used as an example hereinafter. The processing can also be performed at a reduced pressure of 0.5 atm or less.

The processed mixed powder is again placed in the Ar gas atmosphere and heated to 200 to 700° C., preferably 250 to 650° C. for 0.5 to 20 hours. After that, the resultant powder is cooled to room temperature in the Ar gas atmosphere. Adjusting the heating temperature and heating time forms a powder containing a single component of Mg, Zn, Zr, and Ni, a single component whose grain size has grown because relatively small grains of the mixed component powder fuse to other grains or a plurality of components. Smaller grains have higher activity and fuse more rapidly than larger grains.

As described above, the grain size and fused state of grains of the negative electrode active material can be adjusted by adjusting the rotating speed and time of the planetary ball mill or the temperature and time of the reheating. In this manner, the number of very fine grains having a grain size of about 1 μm or less obtained by mechanical grinding can be reduced. Such very fine grains having a grain size of about 1 μm or less exhibit an active corrosion reaction with an electrolyte. Therefore, reducing the number of very fine grains having a grain size of about 1 μm or less is effective in suppressing the corrosion reaction of fine grains with the electrolyte, increasing the battery capacity of the negative electrode active material, and prolonging the cycle life. A sample manufactured as above was observed with an SEM (Scanning Electron Microscope). This sample was an active material powder having a grain size of about 0.5 to 40 μm and an average grain size of 3 to 30 μm.

In the formation of the Mg-based mixed powder, grains readily fuse if Mg is the only component, and Zn prevents this fusion. However, if the mixing amount of Zn is too large, grains tend to coarsen. Mixing Zr has an effect of preventing the formation of coarse grains and encouraging the formation of fine grains.

Accordingly, by optimally adjusting the mixing amounts of the powders of Zn and Zr to the powder of Mg, it is possible to obtain a relatively uniform grain size, allow easy formation of fine grains, decrease the rotational speed of the planetary ball mill, and reduce the processing time. This reduces the processing load of the planetary ball mill.

The weight ratio of the Ni powder to the $(Mg(x).Zn(y).Zr(z))$ mixed powder is determined as follows. Although the $(Mg(x).Zn(y).Zr(z))$ mixed powder achieves a function of storing and releasing hydrogen, the Ni powder has no such function of storing and releasing hydrogen. Therefore, if the weight ratio of the Ni powder is too large, the hydrogen storage amount is reduced, and the battery capacity density is decreased. On the other hand, if the weight ratio of the Ni powder is too small, the catalytic action of Ni is reduced, and the activation of the hydrogen storage/releasing reaction of the $(Mg(x).Zn(y).Zr(z))$ mixed powder decreases. This reduces the initial activation of the battery or reduces the battery capacity or the charge/discharge current density.

Accordingly, by optimizing the weight ratio of the Ni powder to the $(Mg(x).Zn(y).Zr(z))$ mixed powder, it is possible to improve the initial activation of the battery, increase the battery capacity and the charge/discharge current density, and improve the battery characteristics.

Method of Manufacturing Hydrogen Storage Alloy Electrode

A method of forming a hydrogen storage alloy electrode as an alkali battery negative electrode based on the manufacturing method of the present invention will be described below. That is, the Mg-based alloy negative electrode active material made of a mixed powder containing the Mg-based mixed powder obtained by the above manufacturing method and an Ni powder, a small amount of a fine Ni powder as a conductive assistant, and, e.g., slight amounts of polyvinylalcohol and water as binders are mixed to prepare a paste mixture. This paste mixture is filled in a sponge-like Ni porous body having a porosity of 95%. The resultant material is dried, pressed by-a roller press, and cut into a predetermined size. An Ni lead wire is connected by spot welding to form a hydrogen storage alloy electrode as an alkali battery negative electrode.

Alkali Secondary Battery

An Ni-hydrogen alkali secondary battery based on the manufacturing method according to the present invention and using the above hydrogen storage alloy electrode as an alkali battery negative electrode will be described below.

The shapes of secondary batteries are generally a coin, cylinder, rectangle, and sheet. As an example, a cylindrical battery will be described below. A positive electrode, negative electrode, separator, collector electrode, and safety valve as basic constituent elements of a battery of any of the other shapes can be practiced by basically the same techniques as will be described below.

Figure is a sectional view showing a cylindrical alkali secondary battery of the present invention. The basic components are a negative electrode, positive electrode, electrolyte, separator, battery can, safety valve, and output terminal.

Referring to Figure, this secondary battery includes a negative active material layer 502 according to the present invention, a negative electrode 503 made of this negative electrode active material layer 502, a positive electrode active material layer 505, a positive electrode 506 made of this positive electrode active material layer 505, a positive electrode terminal (positive electrode can or positive electrode cap) 509, a separator-electrolyte 507, a gasket 510, a negative electrode collector 501, a positive electrode collector 504, an insulating plate 511, a negative electrode lead 512, a positive electrode lead 513, a safety valve 514, and a negative electrode can (negative electrode terminal) 508.

The individual constituent elements will be described below.

Similar to the positive electrodes of other alkali secondary batteries such as an Ni—Cd battery, nickel hydroxide can be used as the positive electrode active material of the positive electrode.

The electrolyte is generally prepared by adding 1.5 wt % of an aqueous LiOH alkali solution to 30 wt % of an aqueous KOH alkali solution. NaOH can also be added if necessary.

The separator has pores through which hydrogen ions can move and must be insoluble and stable in the electrolyte. Accordingly, suitable materials are glass, polyolefins such as polypropylene and polyethylene, fluorine resins, nonwoven fabrics, e.g., polyimide, and microporous structures. A separator constructed of polyolefin or fluorine resin described above is preferably imparted with a hydrophilic nature in order to increase the wettability to the electrolyte. This process of giving a hydrophilic nature can be easily performed by irradiation with plasma such as hydrogen plasma, oxygen plasma, or fluorine plasma, irradiation with ozone, corona discharge, or processing using chemicals.

It is also possible to use a metal oxide film having fine pores or a resin film formed by combining a plurality of metal oxides.

The material of the input and output terminals of the battery, which also serve as the battery can, i.e., the material of the terminals 508 and 509 shown in Figure is suitably a copper plate or a stainless steel plate. In particular, a titanium-clad stainless steel plate, copper-clad stainless steel plate, or nickel-plated copper plate is often used.

The alkali battery includes the safety valve 514 as a safety device when the internal pressure of the battery rises. For example, rubber, spring, metal ball, or rupture foil can be used as this safety valve.

Examples of the material of the gasket 510 are a fluorine resin, polyamide resin, polysulfone resin, and various rubber materials. As a method of sealing the battery, it is possible to use, e.g., a glass sealing tube, adhesive, welding, or soldering, as well as "caulking" using the gasket.

Also, various organic resin materials and ceramics can be used as the material of the insulating plate 511 shown in Figure.

The present invention will be described in detail below by way of its examples. However, the present invention is not limited to these examples.

EXAMPLE 1

Preparation of Hydrogen Storage Alloy Powder

Various commercially available metal powders described below were prepared. These metal powders were placed in an SUS vessel whose internal atmosphere was replaced by an Ar atmosphere at 1 atm and were processed at 3,000 rpm for 20 hours by a planetary ball mill.

Prepared metal powders
1) Mg powder: purity 99.9%, 100 mesh, 52.7 g
2) Zn powder: purity 99.9%, 200 mesh, 3.4 g
3) Zr powder: purity 98%, average grain size 150 μm, 0.57 g
4) Ni powder: purity 99.9%, 350 mesh, 117.4 g The resultant mixed powder was heated at 250° C. for 2 hours in the Ar atmosphere at 1 atm and cooled to room temperature. This sample powder is A.

Following the same procedure as above, several different sample powders were formed by changing the weight ratios of the above metal powders. Table 1 shows these samples. Table 2 shows the weight ratios of the metal powders in these samples.

To evaluate the performance of battery negative electrodes, cylindrical alkali secondary batteries as shown in Figure were manufactured by using these samples. This manufacturing method will be described below.

Manufacture of Cylindrical Alkali Secondary Battery

Manufacture of Battery Electrode (Negative Electrode)

A battery negative electrode was manufactured as follows by using the sample powder A described above. The manufacture of this battery negative electrode using the sample powder A according to the present invention will be described below.

Water was added to 5 g of the sample powder A, 1 g of an Ni powder having an average grain size of 5 μm as a conductive assistant, and 0.15 g of polyvinyl alcohol, and these material were mixed to prepare a paste mixture. This paste mixture was filled in a sponge-like Ni porous body having an average pore size of 150 μm and a porosity of 95%. The resultant material was dried, pressed by a roller press, and cut into a predetermined size. An Ni lead wire was connected to this electrode by spot welding to obtain an electrode structure serving as the negative electrode of an alkali secondary battery.

Manufacture of Positive Electrode 15 g of a commercially available fine Ni hydroxide powder having an average grain size of 10 μm and 0.3 g of carboxymethylcellulose as a binder were mixed, and water was added to the mixture to prepare a paste. This paste was filled in a foamed Ni substrate having a thickness of 1.5 mm, a pore size of 200 μm, and a porosity of 95%, and the substrate was dried at 120° C. for 1 hour. The obtained electrode was pressed to adjust the thickness. The resultant electrode was cut into a predetermined size, and an Ni lead wire was connected to the electrode by spot welding, thereby obtaining an electrode structure serving as the positive electrode of the secondary battery.

Preparation of Electrolyte

An aqueous solution containing 6 M (mol/l) of potassium hydroxide and 1 M (mol/2) of lithium hydroxide was used.

Preparation of Separator

Polypropylene nonwoven fabric given a hydrophilic nature was used.

Manufacture of Battery

The negative and positive electrodes described above were cylindrically, spirally wound with the separator interposed between them. The resultant cylindrical structure was inserted into a battery can. Leads were welded to portions serving as input and output terminals of the battery can and a battery cap. After the electrolyte was injected, the resultant structure was sealed by caulking to obtain a closed battery. To evaluate the capacity characteristics of the negative electrode, this battery was manufactured as a negative electrode capacity regulated battery in which the capacity of the positive electrode was much larger than that of the negative electrode.

Evaluation of Characteristics of Battery

The characteristics of the battery manufactured as above were evaluated to verify the effect of the present invention. This evaluation of the battery characteristics will be described later.

EXAMPLE 2

To evaluate the effect of the content of Ni in the negative electrode active material according to the present invention, a sample powder was prepared by reducing only the content of Ni from that in Example 1. A battery for evaluation was manufactured following the same procedure as in Example 1 and subjected to the battery characteristics evaluation to be described later (the composition of the sample powder is shown in Table 1).

EXAMPLE 3

To evaluate the effect of the content of Ni in the negative electrode active material according to the present invention, a sample powder was prepared by increasing only the content of Ni from that in Example 1. A battery for evaluation was manufactured following the same procedure as in Example 1 and subjected to the battery characteristics evaluation to be described later (the composition of the sample powder is shown in Table 1).

COMPARATIVE EXAMPLE 1

To evaluate the effect of the content of Ni in the negative electrode active material according to the present invention, a sample powder was prepared by further reducing only the content of Ni from that in Example 1. A battery for evaluation was manufactured following the same procedure as in Example 1 and subjected to the battery characteristics evaluation to be described later (the composition of the sample powder is shown in Table 1).

COMPARATIVE EXAMPLE 2

To evaluate the effect of the content of Ni in the negative electrode active material according to the present invention, a sample powder was prepared by further increasing only the content of Ni from that in Example 1. A battery for evaluation was manufactured following the same procedure as in Example 1 and subjected to the battery characteristics evaluation to be described later (the composition of the sample powder is shown in Table 1).

EXAMPLE 4

To evaluate the effect of the content of Zn in the negative electrode active material according to the present invention, a sample powder was prepared by reducing only the content of Zn from that in Example 1. A battery for evaluation was manufactured following the same procedure as in Example 1 and subjected to the battery characteristics evaluation to be described later (the composition of the sample powder is shown in Table 1).

EXAMPLE 5

To evaluate the effect of the content of Zn in the negative electrode active material according to the present invention, a sample powder was prepared by increasing only the content of Zn from that in Example 1. A battery for evaluation was manufactured following the same procedure as in Example 1 and subjected to the battery characteristics evaluation to be described later (the composition of the sample powder is shown in Table 1).

COMPARATIVE EXAMPLE 3

To evaluate the effect of the content of Zn in the negative electrode active material according to the present invention, a sample powder was prepared by further reducing only the content of Zn from that in Example 1. A battery for evaluation was manufactured following the same procedure as in Example 1 and subjected to the battery characteristics evaluation to be described later (the composition of the sample powder is shown in Table 1).

COMPARATIVE EXAMPLE 4

To evaluate the effect of the content of Zn in the negative electrode active material according to the present invention, a sample powder was prepared by further increasing only the content of Zn from that in Example 1. A battery for evaluation was manufactured following the same procedure as in Example 1 and subjected to the battery characteristics evaluation to be described later (the composition of the sample powder is shown in Table 1).

EXAMPLE 6

To evaluate the effect of the content of Zr in the negative electrode active material according to the present invention, a sample powder was prepared by reducing only the content of Zr from that in Example 1. A battery for evaluation was manufactured following the same procedure as in Example 1 and subjected to the battery characteristics evaluation to be described later (the composition of the sample powder is shown in Table 1).

EXAMPLE 7

To evaluate the effect of the content of Zr in the negative electrode active material according to the present invention, a sample powder was prepared by increasing only the content of Zr from that in Example 1. A battery for evaluation was manufactured following the same procedure as in Example 1 and subjected to the battery characteristics evaluation to be described later (the composition of the sample powder is shown in Table 1).

COMPARATIVE EXAMPLE 5

To evaluate the effect of the content of Zr in the negative electrode active material according to the present invention, a sample powder was prepared by further reducing only the content of Zr from that in Example 1. A battery for evaluation was manufactured following the same procedure as in Example 1 and subjected to the battery characteristics evaluation to be described later (the composition of the sample powder is shown in Table 1).

COMPARATIVE EXAMPLE 6

To evaluate the effect of the content of Zr in the negative electrode active material according to the present invention, a sample powder was prepared by further increasing only the content of Zr from that in Example 1. A battery for evaluation was manufactured following the same procedure as in Example 1 and subjected to the battery characteristics evaluation to be described later (the composition of the sample powder is shown in Table 1).

COMPARATIVE EXAMPLE 7

To evaluate the effect of the contents of Zn and Zr in the negative electrode active material according to the present invention, a sample powder not containing Zn and Zr was prepared. A battery for evaluation was manufactured following the same procedure as in Example 1 and subjected to the battery characteristics evaluation to be described later (the composition of the sample powder is shown in Table 1).

TABLE 1

| Sample name | Mg amount x (g) | Zn amount y (g) | Zr amount z (g) | Ni amount (g) | Σ (g) |
|---|---|---|---|---|---|
| Example 1 | 52.7 | 3.4 | 0.57 | 117.4 | 56.7 |
| Example 2 | 52.7 | 3.4 | 0.57 | 17 | 56.7 |
| Example 3 | 52.7 | 3.4 | 0.57 | 147.4 | 56.7 |
| Comparative Example 1 | 52.7 | 3.4 | 0.57 | 2.84 | 56.7 |
| Comparative Example 2 | 52.7 | 3.4 | 0.57 | 175.8 | 56.7 |
| Example 4 | 54.99 | 1.14 | 0.57 | 117.4 | 56.7 |
| Example 5 | 50.46 | 5.67 | 0.57 | 117.4 | 56.7 |
| Comparative Example 3 | 55.56 | 0.57 | 0.57 | 117.4 | 56.7 |
| Comparative Example 4 | 44.79 | 11.34 | 0.57 | 117.4 | 56.7 |
| Example 6 | 52.73 | 3.4 | 0.057 | 117.4 | 56.7 |
| Example 7 | 51.6 | 3.4 | 1.7 | 117.4 | 56.7 |
| Comparative Example 5 | 53.24 | 3.4 | 0.006 | 117.4 | 56.7 |
| Comparative Example 6 | 47.63 | 3.4 | 5.67 | 117.4 | 56.7 |
| Comparative Example 7 | 52.7 | 0 | 0 | 117.4 | 52.7 |

Note: $\Sigma = x + y + z$

TABLE 2

| | Ni weight ratio Ni/Σ ratio | Mg weight ratio x/Σ (wt %) | Zn weight ratio y/Σ (wt %) | Zr weight ratio z/Σ (wt %) |
|---|---|---|---|---|
| Example 1 | 2.1 | 93 | 6 | 1 |
| Example 2 | 0.3 | 93 | 6 | 1 |
| Example 3 | 2.6 | 93 | 6 | 1 |
| Comparative Example 1 | 0.05 | 93 | 6 | 1 |
| Comparative Example 2 | 3.1 | 93 | 6 | 1 |
| Example 4 | 2.1 | 97 | 2 | 1 |
| Example 5 | 2.1 | 89 | 10 | 1 |
| Comparative Example 3 | 2.1 | 98 | 1 | 1 |
| Comparative Example 4 | 2.1 | 79 | 20 | 1 |
| Example 6 | 2.1 | 93.9 | 6 | 0.1 |
| Example 7 | 2.1 | 91 | 6 | 3 |
| Comparative Example 5 | 2.1 | 93.99 | 6 | 0.01 |
| Comparative Example 6 | 2.1 | 84 | 6 | 10 |
| Comparative Example 7 | 2.2 | 1 | 0 | 0 |

Note: $\Sigma = x + y + z$ (see Table 1)

Evaluation of Battery Characteristics

The characteristics of the batteries manufactured as described above were evaluated to verify the effect of the present invention.

EXAMPLE 8

Evaluation of Battery Characteristics

As the battery evaluation test, at room temperature the battery capacity was charged to 110% by a constant current at a rate of 10 hours (0.1 C). When a pause time of 0.5 hour elapsed after the charge, discharge was performed by a constant current at a rate of 5 hours (0.2 C). The stop voltage was set at 0.8 V, and the pause time after the discharge was set to 0.5 hour. In this manner, charge and discharge were repeated.

Table 3 shows the test results of battery characteristics. In Table 3, the discharge amounts in the 5th cycle from the initial charge/discharge of the batteries of these examples and comparative examples are compared as a measure of the ease of the initial activation of each battery and a measure of the battery capacity. Also, as a measure of the cycle life of each battery, the ratios of the discharge amounts in the 50th cycle to the discharge amounts in the 5th cycle of the batteries of these examples and comparative examples are compared as capacity holding rates.

TABLE 3

| | Initial activation Capacity in 5$^{th}$ cycle a (mAh/g) | Cycle life Capacity in 50$^{th}$ cycle a (mAh/g) | Capacity holding rate b/a |
|---|---|---|---|
| Example 1 | 600 | 580 | 0.97 |
| Example 2 | 300 | 250 | 0.83 |
| Example 3 | 500 | 450 | 0.90 |
| Comparative Example 1 | 20 | 80 | 4.00 |
| Comparative Example 2 | 330 | 220 | 0.67 |
| Example 4 | 350 | 240 | 0.69 |
| Example 5 | 400 | 300 | 0.75 |
| Comparative Example 3 | 280 | 170 | 0.61 |
| Comparative Example 4 | 250 | 120 | 0.48 |
| Example 6 | 350 | 450 | 1.29 |
| Example 7 | 120 | 400 | 3.33 |
| Comparative Example 5 | 100 | 220 | 2.20 |
| Comparative Example 6 | 20 | 100 | 5.00 |
| Comparative Example 7 | 10 | 1 | 0.10 |

Explanation of Battery Characteristics Evaluation Shown in Table 3

Battery Characteristics in Examples 1 to 3 and Comparative Examples 1 and 2 (Effect of Ni Weight Ratio)

An alkali battery A manufactured using the sample powder A of Example 1 according to the present invention had a large initial discharge capacity and reduced the capacity little even when the charge/discharge cycle was repeated. For example, the discharge capacity after 50 cycles of the charge/discharge was 96.7% with reference to the discharge capacity in the 5th cycle from the start of the charge/discharge.

In contrast, the battery of Comparative Example 1 using the sample powder containing a smaller amount of Ni than that in the sample powder A was difficult to activate presumably because the catalytic action of Ni was minimal. The discharge capacity in the 5th cycle from the initial charge/discharge was about 20 mAh/g. This value was lower by about 3.3% than that in Example 1 according to the present invention.

The Ni amount in the battery of Example 2 was intermediate between the batteries of Example 1 and Comparative Example 1. The battery performance of this battery was also intermediate between them.

Conversely, the Ni amount in Comparative Example 2 was much larger than that in Example 1 according to the present invention, so the discharge capacity was reduced. The discharge capacity in the 5th cycle from the initial charge/discharge was 55% of that in Example 1.

The Ni amount in the battery of Example 3 was intermediate between the batteries of Example 1 and Comparative Example 2. The battery performance of this battery was also intermediate between them.

As described above, the battery capacity reduced both when the Ni amount was too small and too large. Therefore, the ratio of the Ni amount to the amount of the rest of the negative electrode active material has a suitable range within which the battery capacity is not reduced. Letting a be the ratio of Ni fine grain weight/(total weight of Mg+Zn+Zr), preferably $0.2<a<3.0$, and more preferably $0.4<a<2.6$.

Battery Characteristics in Examples 4 and 5 and Comparative Examples 3 and 4 (Zn Addition Effect)

As shown in Table 3, the Zn amount in Comparative Example 4 was larger than that in Example 1 according to the present invention. Letting Mg(x).Zn(y).Zr(z) (where x, y, and z are wt % and x+y+z=100) be the composition of the negative electrode active material except for Ni, $y/(x+y+z)$ 0.06 in Example 1. However, $y/(x+y+z)=0.2$ in Comparative Example 4, i.e., the Zn amount was larger.

As can be seen from Table 3, the battery characteristics were such that the battery capacity was lower and the cycle life was shorter than in Example 1. To explicate this reason, the batteries of Example 1 and Comparative Example 4 were disassembled after 50 cycles of discharge, and SEM photographs of the negative electrode active materials were observed. Consequently, the negative electrode active material of the battery of Example 1 had a fine grain size of 2 to 25 μm and an average grain size of 12 μm, i.e., had a relatively uniform grain size. In contrast, the negative electrode active material of the battery of Comparative Example 4 had a fine grain size of 0.5 to 40 μm and an average grain size of about 26 μm. That is, the fine grain size varied to a large degree, and many coarse grains existed probably because the amount of Zn was large. Presumably because the area of the interface between the negative electrode active material and the electrolyte was small, the battery of Comparative Example 4 had a smaller capacity and a shorter cycle life than those of the battery of Example 1.

In Example 5, the addition amount of Zn was intermediate between Example 1 and Comparative Example 4, and the battery performance was also intermediate between them. In Comparative Example 3, the addition amount of Zn was too small, so the Zn addition effect was little. In Example 4, the addition amount of Zn was increased from that in Comparative Example 3, and the battery performance was improved by the Zn addition effect.

As described above, the battery capacity reduced both when the Zn amount was too small and too large. Letting Mg(x).Zn(y).Zr(z) (where x, y, and z are wt % and x+y+z=100) be the composition of the negative electrode active material except for Ni, an addition amount y of Zn preferably satisfies $1<y<15$ wt %, and more preferably $2<y<10$ wt %.

Battery Characteristics in Examples 6 and 7 and Comparative Examples 5 and 6 (Zr Addition Effect)

In Table 3, the amount of Zr in Comparative Example 6 was much larger than that in Example 1 according to the present invention. Letting Mg(x).Zn(y).Zr(z) (where x, y, and z are wt % and x+y+z=100) be the composition of the negative electrode active material except for Ni, $z/(x+y+z)=$ 0.01 in Example 1, whereas $z/(x+y+z)=0.1$ in Comparative Example 6, i.e., the Zr amount was larger.

As can be seen from Table 3, the battery characteristics were such that the battery capacity was much lower than that in Example 1, and the battery was difficult to activate. To explicate this reason, the batteries of Example 1 and Comparative Example 6 were disassembled after 50 cycles of discharge, and SEM photographs of the negative electrode active materials were observed. Consequently, as described previously, the negative electrode active material of the battery of Example 1 had a fine grain size of 2 to 25 μm and an average grain size of 12 μm, i.e., had a relatively uniform grain size. In contrast, the negative electrode active material of the battery of Comparative Example 6 had a fine grain size of 0.1 to 27 μm and an average grain size of about 10 μm. That is, the fine grain size varied to a large degree, and many very fine grains existed probably because the amount of Zr was large. Also, XRD analysis indicated that the surfaces of many fine grains were covered with a dense film of Zr oxide.

This dense Zr oxide film transmits oxygen gas well, but has low transmittance to hydrogen gas. Therefore, the hydrogen storage amount did not increase probably because activation was difficult to achieve with this negative electrode active material. Consequently, the battery of Comparative Example 6 was difficult to activate presumably because the capacity was lower than that of the battery of Example 1.

In Example 7, the Zr addition amount was intermediate between Example 1 and Comparative Example 6, and the battery capacity was also intermediate between them. In Comparative Example 5, no Zr addition effect was achieved because the addition amount of Zr was too small. In Example 6, the battery capacity was increased by increasing the Zr addition amount from that in Comparative Example 5. As described above, the battery capacity was reduced both when the Zr amount was too small and too large. Letting Mg(x).Zn(y).Zr(z) (where x, y, and z are wt % and x+y+z= 100) be the composition of the negative electrode active material except for Ni, an addition amount z of Zr preferably satisfies $0.01<z<5$ wt %, and more preferably $0.1<z<3$ wt %.

In Comparative Example 7 shown in Table 3, neither Zn nor Zr was added, and the amounts of Mg and Ni were set to the same amounts in Example 1 according to the present invention. The battery characteristics were such that the initial discharge capacity was as high as 700 mAh/g, but the cycle life immediately deteriorated, i.e., the discharge capacity in the 5th cycle reduced to 10 mAh/g. This result is consistent with the report of the prior art (37th Battery Symposium in Japan, p. 389, 1996).

From the foregoing, when small amounts of Zn and Zr are added to the Mg-based hydrogen storage alloy of the negative electrode to improve the battery characteristics, the battery characteristics deteriorate both when the addition amounts are too large and too small. That is, optimum values of the addition amounts exist to obtain the best battery characteristics.

More specifically, letting Mg(x).Zn(y).Zr(z) (where x, y, and z are wt % and x+y+z=100) be the composition of the negative electrode active material except for Ni, this composition ratio (Mg(x).Zn(y).Zr(z)) satisfies preferably $80<x<96$ wt %, $1<y<15$ wt %, and $0.01<z<5$ wt %, and more preferably $85<x<92$ wt %, $2<y<10$ wt %, and $0.1<z<3$ wt %.

Also, the weight ratio of the Ni powder to the (Mg(x).Zn(y).Zr(z)) mixed powder is preferably 0.2 to 3.0, and more preferably 0.4 to 2.6.

As has been described above, the present invention can provide an Ni-hydrogen alkali secondary battery which has a high capacity, suppresses the progress of fine powder formation, and has a long cycle life by using an alloy powder containing Ni, Mg, Zn, and Zr and which is capable of electrochemically storing and releasing hydrogen as a negative electrode active material.

The present invention can also provide an Mg-based negative electrode active material used in the above-mentioned high capacity, long cycle life secondary battery, a method of manufacturing the same, and a hydrogen storage alloy electrode.

What is claimed is:

1. An Mg-based alloy negative electrode active material used in a hydrogen storage alloy electrode of an alkali secondary battery consisting essentially of an amorphous alloy containing Ni, Mg, Zn, and Zr and capable of electrochemically storing and releasing hydrogen, wherein a ratio of an Ni weight to a total weight of Mg, Zn, and Zr is 0.2 to 3.0, and wherein letting Mg(x).Zn(y).Zr(z) be a composition of Mg, Zn, and Zr except for Ni, the weight distribution x:y:z satisfies the conditions:

$80<x<96$ wt %, $1<y<15$ wt %, and $0.01<z<5$ wt % (where $x+y+z=100$).

2. The material according to claim 1, wherein the ratio of Ni weight to the total weight of Mg, Zn, and Zr is 0.4 to 2.6.

3. The material according to claim 1, wherein the weight distribution x:y:z satisfies the conditions:

$85<x<92$ wt %, $2<y<10$ wt %, and $0.1<z<3$ wt %.

4. A method of manufacturing an Mg-based alloy negative electrode active material comprising the steps of:

placing powders of Ni, Mg, Zn, and Zr in a vessel; and adjusting said powders by mechanically mixing and grinding said powders.

5. The method according to claim 4, wherein said powders are adjusted by mechanically mixing and grinding said powders in an atmosphere selected from the group consisting of an inert gas and an inert gas containing hydrogen gas at a reduced pressure of not more than 0.5 atm.

6. The method according to claim 4, or 5, further comprising the steps of:

heating said powders at a temperature of 200 to 700° C. for 0.5 to 20 hr after said powders are adjusted by the mechanical mixing and grinding; and cooling said powders after said heating step.

7. A hydrogen storage alloy electrode of an alkali secondary battery having a negative electrode active material layer, wherein said negative electrode active material layer is formed by using an Mg-based alloy negative electrode active material according to claim 1.

8. An alkali secondary battery comprising:

a negative electrode made of a hydrogen storage alloy electrode formed by using an Mg-based alloy negative electrode active material according to claim 1;

a positive electrode containing a metal oxide as a main constituent material;

an alkali electrolyte; and a separator.

* * * * *

UNITED STATES PATENT AND TRADEMARK OFFICE
CERTIFICATE OF CORRECTION

PATENT NO.   : 6,420,067 B1
DATED        : July 16, 2002
INVENTOR(S)  : Seishiro Yoshioka It is certified that error appears in the above-identified patent and that said Letters Patent is hereby corrected as shown below:

The title page should be deleted and replaced with the attached Title page to reflect change within the Abstract.

Delete the entire specification, Columns 1-16 and substitute therefore the attached specification. Columns 1-16.

This certificate supersedes Certificate of Correction issued June 14, 2005.

Signed and Sealed this

Twenty-third Day of August, 2005

JON W. DUDAS
*Director of the United States Patent and Trademark Office*

(12) United States Patent
Yoshioka

(10) Patent No.: US 6,420,067 B1
(45) Date of Patent: *Jul. 16, 2002

(54) MG-BASED NEGATIVE ELECTRODE ACTIVE MATERIAL, METHOD OF MANUFACTURING THE SAME, HYDROGEN-STORAGE ALLOY ELECTRODE, AND ALKALI SECONDARY BATTERY

(75) Inventor: Seishiro Yoshioka, Nara (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/345,416

(22) Filed: Jul. 1, 1999

(30) Foreign Application Priority Data

Jul. 6, 1998 (JP) .......................... 10-204245
Jun. 22, 1999 (JP) .......................... 11-175722

(51) Int. Cl.$^7$ ............................. H01M 4/58
(52) U.S. Cl. ................... 429/218.2; 429/231.6; 429/223; 429/226; 429/229; 420/900
(58) Field of Search .................... 429/218.2, 223, 429/226, 229, 231.6; 420/900

(56) References Cited

U.S. PATENT DOCUMENTS 4,952,465 A * 8/1990 Harris et al. ............... 429/60
5,506,069 A   4/1996 Ovshinsky et al. ........... 429/59
6,214,492 B1 * 4/2001 Kono et al. ............... 429/218.2

FOREIGN PATENT DOCUMENTS

EP 0892451 1/1999
WO 95/34918 12/1995

OTHER PUBLICATIONS

T. Kohno et al., "The electrochemical characteristics of MG–Mg2Ni alloy electrode", 37$^{th}$ Battery Symposium of Japan, Tokyo, pp. 389–394 (1996).
Patent Abstracts of Japan, vol. 1998, No. 09, 7/98 JP 10-102,171.
Patent Abstracts of Japan, vol. 1998, No. 11, 9/98 for JP 10-147, 807.

* cited by examiner

*Primary Examiner*—Gabrielle Brouillette
*Assistant Examiner*—Angela J. Martin
(74) *Attorney, Agent, or Firm*—Fitzpatrick, Cella, Harper & Scinto

(57) ABSTRACT

An Mg-based alloy negative electrode active material used as a hydrogen storage alloy electrode of an alkali secondary battery includes an amorphous alloy containing Ni, Mg, Zn, and Zr and is capable of electrochemically occluding and releasing hydrogen.

8 Claims, 1 Drawing Sheet

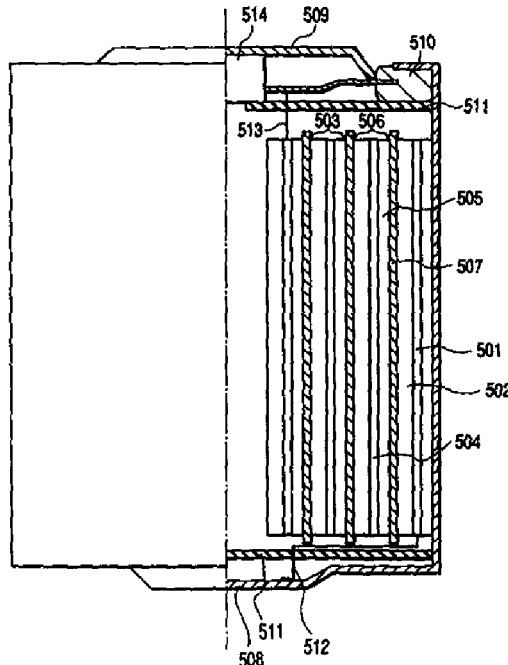

MG-BASED NEGATIVE ELECTRODE ACTIVE MATERIAL, METHOD OF MANUFACTURING THE SAME, HYDROGEN-STORAGE ALLOY ELECTRODE, AND ALKALI SECONDARY BATTERY

BACKGROUND OF THE INVENTION

1. Field of the Invention

The present invention relates to an Mg-based negative electrode active material, a method of manufacturing the same, a hydrogen storage alloy electrode, and an alkali secondary battery. More particularly, the invention relates to a powder material suitable for use in a negative electrode active material as a main material of a secondary battery using an alkali as an electrolyte, a method of manufacturing the same, a negative electrode structure, and a secondary battery.

2. Related Background Art

Recently, $CO_2$ gas contained in the atmosphere has increased; therefore, the possible effects of global warming due to the greenhouse effect have been noted. For example, a thermal electric power plant converts thermal energy obtained by burning fossil fuel into electric energy. Since, however, a large amount of $CO_2$ gas is exhausted by such burning, it is difficult to build new thermal electric power plants. Therefore, so-called load leveling has been proposed as an effective use of electric power generated by a power generator such as a thermal electric power plant. This load leveling levels the load by storing night power as dump power in a secondary battery installed in a home and using the stored power during the day when power consumption is high.

Also, the development of a high energy density secondary battery essential for electric automobiles which do not exhaust air pollutants, e.g., $CO_x$, $NO_x$, and hydrocarbons, is expected. Furthermore, for power supplies of portable apparatuses such as a book personal computers, wordprocessors, video cameras, and portable telephones, the development of small-sized, light-weight secondary batteries is an urgent necessity.

Under the circumstances, a so-called Ni-hydride battery (to be referred to as an Ni-hydride battery hereinafter) has been put into practical use. This Ni-hydride battery is a high capacity secondary battery using a hydrogen storage alloy which stores hydrogen at high density as the negative electrode of an-alkali secondary battery.

As the hydrogen storage alloy, a misch metal-based alloy represented by $Mm(Ni-Co-Mn-Al)_5$, a transition metal-based alloy represented by Ti—Zr—Ni—V—Cr—Co—Mn, and a magnesium-nickel alloy such as $Mg_2Ni$ and MgNi have been studied. Of these alloys, a misch metal-based alloy and a transition metal-based alloy have been put to use in practice as the electrode material.

Unfortunately, the real capacities of both a misch metal-based alloy and a transition metal-based alloy are lower than their theoretical capacities, so further improvements of these alloys are desired.

Mg is light in weight and has a large hydrogen storage amount (7.6 wt % for $MgH_2$). Therefore, if Mg can be applied to a battery as its negative electrode, a high capacity battery is expected. However, Mg has a high hydrogen equilibrium dissociation temperature (the dissociation temperature is 287° C. when the hydrogen equilibrium dissociation pressure is 0.1 MPa) and hence has low hydrogen storage/releasing ability at room temperature. So, it is difficult to apply Mg to a battery.

As an electrode using a magnesium-nickel alloy, the 37th Battery Symposium in Japan, p. 389 (1996), has announced that a high discharge capacity of 750 mAh/g is obtained in the first charge/discharge cycle by an electrode using an amorphous $Mg_2Ni$ alloy powder adjusted by mechanical grinding. However, when the charge/discharge cycle is repeated, the discharge capacity rapidly decreases, so no magnesium-nickel alloy electrode having a stable high discharge capacity is obtained.

To solve the above problems, the present inventors have made extensive studies and found a stable alkali secondary battery using a novel Mg-based alloy and having a high capacity and a long cycle life.

SUMMARY OF THE INVENTION

That is, it is an object of the present invention to provide an Ni-hydrogen alkali secondary battery which has a high capacity, suppresses the progress of fine powder formation, and hence has a long cycle life, by using an alloy powder containing Ni, Mg, Zn, and Zr and which is capable of electrochemically storing and releasing hydrogen as a negative electrode active material.

It is another object of the present invention to provide an Mg-based negative electrode active material for use in the above-mentioned high capacity, long cycle life secondary battery, a method of manufacturing the same, and a hydrogen storage alloy electrode.

It is still another object of the present invention to provide an Mg-based alloy negative electrode active material used in a hydrogen storage alloy electrode of an alkali secondary battery comprising an amorphous alloy containing Ni, Mg, Zn, and Zr and which is capable of electrochemically storing and releasing hydrogen.

The ratio of the Ni weight to the total weight of Mg, Zn, and Zr is 0.2 to 3.0, preferably 0.4 to 2.6.

Letting $Mg(x).Zn(y).Zr(z)$ be the composition of Mg, Zn, and Zr except for Ni, it is desirable that $80<x<96$ wt %, $1<y<15$ wt %, and $0.01<z<5$ wt %, preferably $85<x<92$ wt %, $2<y<10$ wt %, and $0.1<z<3$ wt % (where $x+y+z=100$).

It is still another object of the present invention to provide a method of manufacturing an Mg-based alloy negative electrode active material comprising the steps of placing powders of Ni, Mg, Zn, and Zr in a vessel, and adjusting the powders by mechanically mixing and grinding the powders.

The present invention includes a method in which the powders are mechanically mixed and ground by rotating the vessel and using the centrifugal force of the rotation.

The present invention includes a method in which the powders are adjusted by mechanically mixing and grinding the powders in an atmosphere selected from the group consisting of an inert gas and an inert gas containing hydrogen gas at a reduced pressure of 0.5 atm or less.

The present invention includes a method which further comprises a heating step of heating the powders at a temperature of 200 to 700° C. for 0.5 to 20 hours after the powders are adjusted by the mechanical mixing and grinding and a cooling step of cooling the powders after the heating step.

It is still another object of the present invention to provide a hydrogen storage alloy electrode of an alkali secondary battery having a negative electrode active material layer, wherein the negative electrode active material layer is formed using an Mg-based alloy negative electrode active material defined by the present invention.

It is still another object of the present invention to provide an alkali secondary battery comprising a negative electrode made of a hydrogen storage alloy electrode formed using the above-mentioned Mg-based alloy negative electrode active material, a positive electrode containing a metal oxide as a main constituent material, an alkali electrolyte, and a separator.

BRIEF DESCRIPTION OF THE DRAWING

Figure is a sectional view showing a cylindrical alkali secondary battery according to the present invention.

DETAILED DESCRIPTION OF THE PREFERRED EMBODIMENTS

A hydrogen storage alloy electrode of the present invention includes a negative electrode of an alkali secondary battery comprising the negative electrode containing an Mg-based hydrogen storage alloy as a main constituent material, a positive electrode containing a metal oxide as a main constituent material, an alkali electrolyte, and a separator, wherein a negative electrode active material of the negative electrode uses "an amorphous alloy" containing Ni, Mg, Zn, and Zr as main components and is capable of electrochemically storing and releasing hydrogen.

In the present invention, "an amorphous alloy" is an alloy in which a metal powder contains an amorphous phase or is amorphous. Whether a metal powder contains an amorphous phase or is amorphous can be determined by the following method of analysis.

In an x-ray chart indicating the peak intensity as a function of the diffraction angle by x-ray diffraction analysis, a sharp peak of a crystal originally appears. However, if a metal powder contains an amorphous phase, the half width of the peak increases to form a broad peak. A complete amorphous metal powder has no x-ray diffraction peak at all. A radial distribution function is calculated from the result of x-ray diffraction analysis and indicates the distances and numbers of atoms from a certain atom. In this radial distribution function, a crystal having a fixed interatomic distance shows a sharp peak in a point at a specific distance. In the case of an amorphous metal powder, however, the density is high in a short distance close to the size of the atom and is low in a long distance.

Also, in an electron diffraction pattern obtained by electron diffraction analysis, the spot pattern of a crystal changes to the pattern of an amorphous metal powder in the order of ring pattern→diffused ring pattern→halo pattern. A diffused ring pattern shows that the metal powder contains an amorphous phase, and a halo pattern shows that the metal powder is amorphous.

Furthermore, in DSC (Differential Scanning Calorimetry), a thermal peak resulting from crystallization is observed when a metal powder having an amorphous phase is heated (to, e.g., about 600° C.).

In order for a negative electrode alloy powder according to the present invention to have preferable electrode characteristics, the average grain size of the metal powder having an amorphous phase is preferably 0.1 to 50 μm, and more preferably 0.3 to 30 μm.

Also, the size of the crystallite calculated from the x-ray diffraction analysis of the metal powder is preferably 800 Å or less, and more preferably 600 Å or less. In the present invention, the size of a crystallite grain is determined using the following Scherrer's equation from the half width of the peak of an x-ray diffraction curve and the diffraction angle obtained using CuKα as an x-ray source:

$$Lc = 0.94\lambda/(\beta \cos \theta) \quad \text{(Scherrer's equation)}$$

where $Lc$: size of crystallite
  $\lambda$: wavelength of x-ray beam
  $\beta$: half width of peak
  $\theta$: diffraction angle By the use of fine crystal grains as described above, it is possible to allow smooth electrochemical reaction during charge/discharge and improve the discharge capacity. It is also possible to decrease strains produced by the entry and exit of hydrogen during charge/discharge and prolong the cycle life.

The present invention includes a negative electrode in which the composition $(Mg(x).Zn(y).Zr(z))$ except for Ni of the negative electrode active material satisfies $80<x<96$ wt %, $1<y<15$ wt %, and $0.01<z<5$ wt % (where $x+y+z=100$).

The present invention includes a negative electrode in which the composition $(Mg(x).Zn(y).Zr(z))$ except for Ni of the negative electrode active material satisfies $85<x<92$ wt %, $2<y<10$ wt %, and $0.1<z<3$ wt % (where $x+y+z=100$).

The present invention includes a negative electrode in which the negative electrode active material is made of an amorphous alloy containing Mg, Zn, Zr, and Ni having the above composition and is capable of electrochemically storing and releasing hydrogen, and the ratio of the Ni weight to the (total weight of Mg+Zn+Zr) is 0.2 to 3.0, preferably 0.4 to 2.6.

A method of manufacturing an Mg-based alloy negative electrode active material of the present invention comprises the steps of placing a powder containing Ni, Mg, Zn, and Zr in a vessel which minimally, if at all, reacts with this powder in an atmosphere selected from an inert gas or an inert gas containing hydrogen gas at a reduced pressure of 0.5 atm or less, mechanically mixing and grinding the powder by the centrifugal force of rotation using an apparatus capable of rotating the vessel, and adjusting the resultant powder.

The method of manufacturing an Mg-based alloy negative electrode active material further comprises a heating step of heating the powder in the aforementioned atmosphere at a temperature of 200 to 700° C. for 0.5 to 20 hours, and a cooling step of cooling the powder to room temperature in the same atmosphere.

An alkali secondary battery of the present invention comprises a negative electrode containing an Mg-based hydrogen storage alloy as a main constituent material, a positive electrode containing a metal oxide as a main constituent material, an alkali electrolyte, and a separator, wherein the hydrogen storage alloy electrode having the Mg-based alloy negative electrode active material described above is used as the negative electrode.

The Mg-based alloy negative electrode active material, method of manufacturing the same, hydrogen storage alloy electrode, and alkali secondary battery using the same according to the present invention will be described in detail below.

Negative Electrode
Composition of Mg-Based Alloy Negative Electrode Active Material The first condition of the Mg-based alloy negative electrode active material is as follows. As an Mg-based alloy powder containing Ni, Mg, Zn, and Zr as main components and serving as a negative electrode active material, Mg, Zn, and Zr powders are weighed such that the composition represented by $(Mg(x).Zn(y).Zr(z))$ of the Mg-based alloy powder containing Zn and Zr satisfies preferably $80<x<96$ wt %, $1<y<15$ wt %, and $0.01<z<5$ wt %, and more preferably $85<x<92$ wt %, $2<y<10$ wt %, and $0.1<z<3$ wt % (where $x+y+z=100$).

As the second condition, an Ni powder to be mixed in the Mg-based alloy powder to increase the activity of the negative electrode active material and increase the conductivity of the electrode is weighed as follows.

That is, the Ni powder is so weighed that in the Mg, Zn, and Zr powders and the Ni powder, the weight ratio of the Ni powder to the mixed powder $(Mg(x).Zn(y).Zr(z))$, i.e., the weight ratio of Ni powder/$(Mg(x).Zn(y).Zr(z))$ is preferably 0.2 to 3.0, more preferably 0.4 to 2.6. As these Mg, Zn, Zr, and Ni powders, commercially available metal powders having a grain size of 0.1 to 300 μm can be used.

Method of Manufacturing Mg-Based Alloy Negative Electrode Active Material

A method of manufacturing a novel negative electrode active material by mixing the aforementioned weighed metal powders will be described below.

As an example, a method of manufacturing a total of about 33 g of an Mg-based negative electrode active material will be described. The total weight is about 33 g because apparatuses and equipment are readily available. To manufacture large amounts, large apparatuses and much equipment need be installed.

A total of 10 g of Mg, Zn, and Zr powders meeting the above first condition and 23 g of an Ni powder meeting the above second condition are placed in a stainless steel (SUS) vessel containing Ar gas at 1 atm. The vessel is set in a planetary ball mill, and mechanical grinding is performed at a rotational speed of 800 to 3,000 rpm for 0.5 to 40 hours. The rotational speed and processing time need only be so set that the grain size of fine grains of the mixed metal powder is approximately 40 μm or less. If a large amount of grains whose grain size exceeds 40 μm exist, the area of the interface between the negative electrode active material and the electrolyte is reduced. This makes activation as a negative electrode active material difficult and also reduces the battery capacity.

Instead of Ar gas at 1 atm, a so-called inert gas atmosphere or a reducing atmosphere can also be used. Examples are an He gas atmosphere at 1 atm and an Ar gas or He gas atmosphere at 1 atm containing 1 to 10 mol % of $H_2$ gas. An Ar gas atmosphere will be used as an example hereinafter. The processing can also be performed at a reduced pressure of 0.5 atm or less.

The processed mixed powder is again placed in the Ar gas atmosphere and heated to 200 to 700° C., preferably 250 to 650° C. for 0.5 to 20 hours. After that, the resultant powder is cooled to room temperature in the Ar gas atmosphere. Adjusting the heating temperature and heating time forms a powder containing a single component of Mg, Zn, Zr, and Ni, a single component whose grain size has grown because relatively small grains of the mixed component powder fuse to other grains or a plurality of components. Smaller grains have higher activity and fuse more rapidly than larger grains.

As described above, the grain size and fused state of grains of the negative electrode active material can be adjusted by adjusting the rotating speed and time of the planetary ball mill or the temperature and time of the reheating. In this manner, the number of very fine grains having a grain size of about 1 μm or less obtained by mechanical grinding can be reduced. Such very fine grains having a grain size of about 1 μm or less exhibit an active corrosion reaction with an electrolyte. Therefore, reducing the number of very fine grains having a grain size of about 1 μm or less is effective in suppressing the corrosion reaction of fine grains with the electrolyte, increasing the battery capacity of the negative electrode active material, and prolonging the cycle life. A sample manufactured as above was observed with an SEM (Scanning Electron Microscope). This sample was an active material powder having a grain size of about 0.5 to 40 μm and an average grain size of 3 to 30μm.

In the formation of the Mg-based mixed powder, grains readily fuse if Mg is the only component, and Zn prevents this fusion. However, if the mixing amount of Zn is too large, grains tend to coarsen. Mixing Zr has an effect of preventing the formation of coarse grains and encouraging the formation of fine grains.

Accordingly, by optimally adjusting the mixing amounts of the powders of Zn and Zr to the powder of Mg, it is possible to obtain a relatively uniform grain size, allow easy formation of fine grains, decrease the rotational speed of the planetary ball mill, and reduce the processing time. This reduces the processing load of the planetary ball mill.

The weight ratio of the Ni powder to the $(Mg(x).Zn(y).Zr(z))$ mixed powder is determined as follows. Although the $(Mg(x).Zn(y).Zr(z))$ mixed powder achieves a function of storing and releasing hydrogen, the Ni powder has no such function of storing and releasing hydrogen. Therefore, if the weight ratio of the Ni powder is too large, the hydrogen storage amount is reduced, and the battery capacity density is decreased. On the other hand, if the weight ratio of the Ni powder is too small, the catalytic-action of Ni is reduced, and the activation of the hydrogen storage/releasing reaction of the $(Mg(x).Zn(y).Zr(z))$ mixed powder decreases. This reduces the initial activation of the battery or reduces the battery capacity or the charge/discharge current density.

Accordingly, by optimizing the weight ratio of the Ni powder to the $(Mg(x).Zn(y).Zr(z))$ mixed powder, it is possible to improve the initial activation of the battery, increase the battery capacity and the charge/discharge current density, and improve the battery characteristics.

Method of Manufacturing Hydrogen Storage Alloy Electrode

A method of forming a hydrogen storage alloy electrode as an alkali battery negative electrode based on the manufacturing method of the present invention will be described below. That is, the Mg-based alloy negative electrode active material made of a mixed powder containing the Mg-based mixed powder obtained by the above manufacturing method and an Ni powder, a small amount of a fine Ni powder as a conductive assistant, and, e.g., slight amounts of polyvinylalcohol and water as binders are mixed to prepare a paste mixture. This paste mixture is filled in a sponge-like Ni porous body having a porosity of 95%. The resultant material is dried, pressed by-a roller press, and cut into a predetermined size. An Ni lead wire is connected by spot welding to form a hydrogen storage alloy electrode as an alkali battery negative electrode.

Alkali Secondary Battery

An Ni-hydrogen alkali secondary battery based on the manufacturing method according to the present invention and using the above hydrogen storage alloy electrode as an alkali battery negative electrode will be described below.

The shapes of secondary batteries are generally a coin, cylinder, rectangle, and sheet. As an example, a cylindrical battery will be described below. A positive electrode, negative electrode, separator, collector electrode, and safety valve as basic constituent elements of a battery of any of the other shapes can be practiced by basically the same techniques as will be described below.

Figure is a sectional view showing a cylindrical alkali secondary battery of the present invention. The basic components are a negative electrode, positive electrode, electrolyte, separator, battery can, safety valve, and output terminal.

Referring to Figure, this secondary battery includes a negative active material layer 502 according to the present invention, a negative electrode 503 made of this negative electrode active material layer 502, a positive electrode active material layer 505, a positive electrode 506 made of this positive electrode active material layer 505, a positive electrode terminal (positive electrode can or positive electrode cap) 509, a separator-electrolyte 507, a gasket 510, a negative electrode collector 501, a positive electrode collector 504, an insulating plate 511, a negative electrode lead 512, a positive electrode lead 513, a safety valve 514, and a negative electrode can (negative electrode terminal) 508.

The individual constituent elements will be described below.

Similar to the positive electrodes of other alkali secondary batteries such as an Ni—Cd battery, nickel hydroxide can be used as the positive electrode active material of the positive electrode.

The electrolyte is generally prepared by adding 1.5 wt % of an aqueous LiOH alkali solution to 30 wt % of an aqueous KOH alkali solution. NaOH can also be added if necessary.

The separator has pores through which hydrogen ions can move and must be insoluble and stable in the electrolyte. Accordingly, suitable materials are glass, polyolefins such as polypropylene and polyethylene, fluorine resins, nonwoven fabrics, e.g., polyimide, and microporous structures. A separator constructed of polyolefin or fluorine resin described above is preferably imparted with a hydrophilic nature in order to increase the wettability to the electrolyte. This process of giving a hydrophilic nature can be easily performed by irradiation with plasma such as hydrogen plasma, oxygen plasma, or fluorine plasma, irradiation with ozone, corona discharge, or processing using chemicals.

It is also possible to use a metal oxide film having fine pores or a resin film formed by combining a plurality of metal oxides.

The material of the input and output terminals of the battery, which also serve as the battery can, i.e., the material of the terminals 508 and 509 shown in Figure is suitably a copper plate or a stainless steel plate. In particular, a titanium-clad stainless steel plate, copper-clad stainless steel plate, or nickel-plated copper plate is often used.

The alkali battery includes the safety valve 514 as a safety device when the internal pressure of the battery rises. For example, rubber, spring, metal ball, or rupture foil can be used as this safety valve.

Examples of the material of the gasket 510 are a fluorine resin, polyamide resin, polysulfone resin, and various rubber materials. As a method of sealing the battery, it is possible to use, e.g., a glass sealing tube, adhesive, welding, or soldering, as well as "caulking" using the gasket.

Also, various organic resin materials and ceramics can be used as the material of the insulating plate 511 shown in Figure.

The present invention will be described in detail below by way of its examples. However, the present invention is not limited to these examples.

EXAMPLE 1

Preparation of Hydrogen Storage Alloy Powder

Various commercially available metal powders described below were prepared. These metal powders were placed in an SUS vessel whose internal atmosphere was replaced by an Ar atmosphere at 1 atm and were processed at 3,000 rpm for 20 hours by a planetary ball mill.

Prepared metal powders
1) Mg powder: purity 99.9%, 100 mesh, 52.7 g
2) Zn powder: purity 99.9%, 200 mesh, 3.4 g
3) Zr powder: purity 98%, average grain size 150 µm, 0.57 g
4) Ni powder: purity 99.9%, 350 mesh, 117.4 g The resultant mixed powder was heated at 250° C. for 2 hours in the Ar atmosphere at 1 atm and cooled to room temperature. This sample powder is A.

Following the same procedure as above, several different sample powders were formed by changing the weight ratios of the above metal powders. Table 1 shows these samples. Table 2 shows the weight ratios of the metal powders in these samples.

To evaluate the performance of battery negative electrodes, cylindrical alkali secondary batteries as shown in Figure were manufactured by using these samples. This manufacturing method will be described below.

Manufacture of Cylindrical Alkali Secondary Battery

Manufacture of Battery Electrode (Negative Electrode)

A battery negative electrode was manufactured as follows by using the sample powder A described above. The manufacture of this battery negative electrode using the sample powder A according to the present invention will be described below.

Water was added to 5 g of the sample powder A, 1 g of an Ni powder having an average grain size of 5 µm as a conductive assistant, and 0.15 g of polyvinyl alcohol, and these material were mixed to prepare a paste mixture. This paste mixture was filled in a sponge-like Ni porous body having an average pore size of 150 µm and a porosity of 95%. The resultant material was dried, pressed by a roller press, and cut into a predetermined size. An Ni lead wire was connected to this electrode by spot welding to obtain an electrode structure serving as the negative electrode of an alkali secondary battery.

Manufacture of Positive Electrode 15 g of a commercially available fine Ni hydroxide powder having an average grain size of 10 µm and 0.3 g of carboxymethylcellulose as a binder were mixed, and water was added to the mixture to prepare a paste. This paste was filled in a foamed Ni substrate having a thickness of 1.5 mm, a pore size of 200 µm, and a porosity of 95%, and the substrate was dried at 120° C. for 1 hour. The obtained electrode was pressed to adjust the thickness. The resultant electrode was cut into a predetermined size, and an Ni lead wire was connected to the electrode by spot welding, thereby obtaining an electrode structure serving as the positive electrode of the secondary battery.

Preparation of Electrolyte

An aqueous solution containing 6 M (mol/l) of potassium hydroxide and 1 M (mol/2) of lithium hydroxide was used.

Preparation of Separator

Polypropylene nonwoven fabric given a hydrophilic nature was used.

Manufacture of Battery

The negative and positive electrodes described above were cylindrically, spirally wound with the separator interposed between them. The resultant cylindrical structure was inserted into a battery can. Leads were welded to portions serving as input and output terminals of the battery can and a battery cap. After the electrolyte was injected, the resultant structure was sealed by caulking to obtain a closed battery. To evaluate the capacity characteristics of the negative electrode, this battery was manufactured as a negative electrode capacity regulated battery in which the capacity of the positive electrode was much larger than that of the negative electrode.

Evaluation of Characteristics of Battery

The characteristics of the battery manufactured as above were evaluated to verify the effect of the present invention. This evaluation of the battery characteristics will be described later.

EXAMPLE 2

To evaluate the effect of the content of Ni in the negative electrode active material according to the present invention, a sample powder was prepared by reducing only the content of Ni from that in Example 1. A battery for evaluation was manufactured following the same procedure as in Example 1 and subjected to the battery characteristics evaluation to be described later (the composition of the sample powder is shown in Table 1).

EXAMPLE 3

To evaluate the effect of the content of Ni in the negative electrode active material according to the present invention, a sample powder was prepared by increasing only the content of Ni from that in Example 1. A battery for evaluation was manufactured following the same procedure as in Example 1 and subjected to the battery characteristics evaluation to be described later (the composition of the sample powder is shown in Table 1).

COMPARATIVE EXAMPLE 1

To evaluate the effect of the content of Ni in the negative electrode active material according to the present invention, a sample powder was prepared by further reducing only the content of Ni from that in Example 1. A battery for evaluation was manufactured following the same procedure as in Example 1 and subjected to the battery characteristics evaluation to be described later (the composition of the sample powder is shown in Table 1).

COMPARATIVE EXAMPLE 2

To evaluate the effect of the content of Ni in the negative electrode active material according to the present invention, a sample powder was prepared by further increasing only the content of Ni from that in Example 1. A battery for evaluation was manufactured following the same procedure as in Example 1 and subjected to the battery characteristics evaluation to be described later (the composition of the sample powder is shown in Table 1).

EXAMPLE 4

To evaluate the effect of the content of Zn in the negative electrode active material according to the present invention, a sample powder was prepared by reducing only the content of Zn from that in Example 1. A battery for evaluation was manufactured following the same procedure as in Example 1 and subjected to the battery characteristics evaluation to be described later (the composition of the sample powder is shown in Table 1).

EXAMPLE 5

To evaluate the effect of the content of Zn in the negative electrode active material according to the present invention, a sample powder was prepared by increasing only the content of Zn from that in Example 1. A battery for evaluation was manufactured following the same procedure as in Example 1 and subjected to the battery characteristics evaluation to be described later (the composition of the sample powder is shown in Table 1).

COMPARATIVE EXAMPLE 3

To evaluate the effect of the content of Zn in the negative electrode active material according to the present invention, a sample powder was prepared by further reducing only the content of Zn from that in Example 1. A battery for evaluation was manufactured following the same procedure as in Example 1 and subjected to the battery characteristics evaluation to be described later (the composition of the sample powder is shown in Table 1).

COMPARATIVE EXAMPLE 4

To evaluate the effect of the content of Zn in the negative electrode active material according to the present invention, a sample powder was prepared by further increasing only the content of Zn from that in Example 1. A battery for evaluation was manufactured following the same procedure as in Example 1 and subjected to the battery characteristics evaluation to be described later (the composition of the sample powder is shown in Table 1).

EXAMPLE 6

To evaluate the effect of the content of Zr in the negative electrode active material according to the present invention, a sample powder was prepared by reducing only the content of Zr from that in Example 1. A battery for evaluation was manufactured following the same procedure as in Example 1 and subjected to the battery characteristics evaluation to be described later (the composition of the sample powder is shown in Table 1).

EXAMPLE 7

To evaluate the effect of the content of Zr in the negative electrode active material according to the present invention, a sample powder was prepared by increasing only the content of Zr from that in Example 1. A battery for evaluation was manufactured following the same procedure as in Example 1 and subjected to the battery characteristics evaluation to be described later (the composition of the sample powder is shown in Table 1).

COMPARATIVE EXAMPLE 5

To evaluate the effect of the content of Zr in the negative electrode active material according to the present invention, a sample powder was prepared by further reducing only the content of Zr from that in Example 1. A battery for evaluation was manufactured following the same procedure as in Example 1 and subjected to the battery characteristics evaluation to be described later (the composition of the sample powder is shown in Table 1).

COMPARATIVE EXAMPLE 6

To evaluate the effect of the content of Zr in the negative electrode active material according to the present invention, a sample powder was prepared by further increasing only the content of Zr from that in Example 1. A battery for evaluation was manufactured following the same procedure as in Example 1 and subjected to the battery characteristics evaluation to be described later (the composition of the sample powder is shown in Table 1).

COMPARATIVE EXAMPLE 7

To evaluate the effect of the contents of Zn and Zr in the negative electrode active material according to the present invention, a sample powder not containing Zn and Zr was prepared. A battery for evaluation was manufactured following the same procedure as in Example 1 and subjected to the battery characteristics evaluation to be described later (the composition of the sample powder is shown in Table 1).

TABLE 1

| Sample name | Mg amount x (g) | Zn amount y (g) | Zr amount z (g) | Ni amount (g) | Σ (g) |
|---|---|---|---|---|---|
| Example 1 | 52.7 | 3.4 | 0.57 | 117.4 | 56.7 |
| Example 2 | 52.7 | 3.4 | 0.57 | 17 | 56.7 |
| Example 3 | 52.7 | 3.4 | 0.57 | 147.4 | 56.7 |
| Comparative Example 1 | 52.7 | 3.4 | 0.57 | 2.84 | 56.7 |
| Comparative Example 2 | 52.7 | 3.4 | 0.57 | 175.8 | 56.7 |
| Example 4 | 54.99 | 1.14 | 0.57 | 117.4 | 56.7 |
| Example 5 | 50.46 | 5.67 | 0.57 | 117.4 | 56.7 |
| Comparative Example 3 | 55.56 | 0.57 | 0.57 | 117.4 | 56.7 |
| Comparative Example 4 | 44.79 | 11.34 | 0.57 | 117.4 | 56.7 |
| Example 6 | 52.73 | 3.4 | 0.057 | 117.4 | 56.7 |
| Example 7 | 51.6 | 3.4 | 1.7 | 117.4 | 56.7 |
| Comparative Example 5 | 53.24 | 3.4 | 0.006 | 117.4 | 56.7 |
| Comparative Example 6 | 47.63 | 3.4 | 5.67 | 117.4 | 56.7 |
| Comparative Example 7 | 52.7 | 0 | 0 | 117.4 | 52.7 |

Note: Σ = x + y + z

TABLE 2

| | Ni weight ratio Ni/Σ ratio | Mg weight ratio x/Σ (wt %) | Zn weight ratio y/Σ (wt %) | Zr weight ratio z/Σ (wt %) |
|---|---|---|---|---|
| Example 1 | 2.1 | 93 | 6 | 1 |
| Example 2 | 0.3 | 93 | 6 | 1 |
| Example 3 | 2.6 | 93 | 6 | 1 |
| Comparative Example 1 | 0.05 | 93 | 6 | 1 |
| Comparative Example 2 | 3.1 | 93 | 6 | 1 |
| Example 4 | 2.1 | 97 | 2 | 1 |
| Example 5 | 2.1 | 89 | 10 | 1 |
| Comparative Example 3 | 2.1 | 98 | 1 | 1 |
| Comparative Example 4 | 2.1 | 79 | 20 | 1 |
| Example 6 | 2.1 | 93.9 | 6 | 0.1 |
| Example 7 | 2.1 | 91 | 6 | 3 |
| Comparative Example 5 | 2.1 | 93.99 | 6 | 0.01 |
| Comparative Example 6 | 2.1 | 84 | 6 | 10 |
| Comparative Example 7 | 2.2 | 1 | 0 | 0 |

Note: Σ = x + y + z (see Table 1)

Evaluation of Battery Characteristics

The characteristics of the batteries manufactured as described above were evaluated to verify the effect of the present invention.

EXAMPLE 8

Evaluation of Battery Characteristics

As the battery evaluation test, at room temperature the battery capacity was charged to 110% by a constant current at a rate of 10 hours (0.1 C). When a pause time of 0.5 hour elapsed after the charge, discharge was performed by a constant current at a rate of 5 hours (0.2 C). The stop voltage was set at 0.8 V, and the pause time after the discharge was set to 0.5 hour. In this manner, charge and discharge were repeated.

Table 3 shows the test results of battery characteristics. In Table 3, the discharge amounts in the 5th cycle from the initial charge/discharge of the batteries of these examples and comparative examples are compared as a measure of the ease of the initial activation of each battery and a measure of the battery capacity. Also, as a measure of the cycle life of each battery, the ratios of the discharge amounts in the 50th cycle to the discharge amounts in the 5th cycle of the batteries of these examples and comparative examples are compared as capacity holding rates.

TABLE 3

| | Initial activation Capacity in $5^{th}$ cycle a (mAh/g) | Cycle life Capacity in $50^{th}$ cycle a (mAh/g) | Capacity holding rate b/a |
|---|---|---|---|
| Example 1 | 600 | 580 | 0.97 |
| Example 2 | 300 | 250 | 0.83 |
| Example 3 | 500 | 450 | 0.90 |
| Comparative Example 1 | 20 | 80 | 4.00 |
| Comparative Example 2 | 330 | 220 | 0.67 |
| Example 4 | 350 | 240 | 0.69 |
| Example 5 | 400 | 300 | 0.75 |
| Comparative Example 3 | 280 | 170 | 0.61 |
| Comparative Example 4 | 250 | 120 | 0.48 |
| Example 6 | 350 | 450 | 1.29 |
| Example 7 | 120 | 400 | 3.33 |
| Comparative Example 5 | 100 | 220 | 2.20 |
| Comparative Example 6 | 20 | 100 | 5.00 |
| Comparative Example 7 | 10 | 1 | 0.10 |

Explanation of Battery Characteristics Evaluation Shown in Table 3

Battery Characteristics in Examples 1 to 3 and Comparative Examples 1 and 2 (Effect of Ni Weight Ratio)

An alkali battery A manufactured using the sample powder A of Example 1 according to the present invention had a large initial discharge capacity and reduced the capacity little even when the charge/discharge cycle was repeated. For example, the discharge capacity after 50 cycles of the charge/discharge was 96.7% with reference to the discharge capacity in the 5th cycle from the start of the charge/discharge.

In contrast, the battery of Comparative Example 1 using the sample powder containing a smaller amount of Ni than that in the sample powder A was difficult to activate presumably because the catalytic action of Ni was minimal. The discharge capacity in the 5th cycle from the initial charge/discharge was about 20 mAh/g. This value was lower by about 3.3% than that in Example 1 according to the present invention.

The Ni amount in the battery of Example 2 was intermediate between the batteries of Example 1 and Comparative Example 1. The battery performance of this battery was also intermediate between them.

Conversely, the Ni amount in Comparative Example 2 was much larger than that in Example 1 according to the present invention, so the discharge capacity was reduced. The discharge capacity in the 5th cycle from the initial charge/discharge was 55% of that in Example 1.

The Ni amount in the battery of Example 3 was intermediate between the batteries of Example 1 and Comparative Example 2. The battery performance of this battery was also intermediate between them.

As described above, the battery capacity reduced both when the Ni amount was too small and too large. Therefore, the ratio of the Ni amount to the amount of the rest of the negative electrode active material has a suitable range within which the battery capacity is not reduced. Letting a be the ratio of Ni fine grain weight/(total weight of Mg+Zn+Zr), preferably $0.2<a<3.0$, and more preferably $0.4<a<2.6$.

Battery Characteristics in Examples 4 and 5 and Comparative Examples 3 and 4 (Zn Addition Effect)

As shown in Table 3, the Zn amount in Comparative Example 4 was larger than that in Example 1 according to the present invention. Letting $Mg(x).Zn(y).Zr(z)$ (where x, y, and z are wt % and $x+y+z=100$) be the composition of the negative electrode active material except for Ni, $y/(x+y+z)$ 0.06 in Example 1. However, $y/(x+y+z)=0.2$ in Comparative Example 4, i.e., the Zn amount was larger.

As can be seen from Table 3, the battery characteristics were such that the battery capacity was lower and the cycle life was shorter than in Example 1. To explicate this reason, the batteries of Example 1 and Comparative Example 4 were disassembled after 50 cycles of discharge, and SEM photographs of the negative electrode active materials were observed. Consequently, the negative electrode active material of the battery of Example 1 had a fine grain size of 2 to 25 μm and an average grain size of 12 μm, i.e., had a relatively uniform grain size. In contrast, the negative electrode active material of the battery of Comparative Example 4 had a fine grain size of 0.5 to 40 μm and an average grain size of about 26 μm. That is, the fine grain size varied to a large degree, and many coarse grains existed probably because the amount of Zn was large. Presumably because the area of the interface between the negative electrode active material and the electrolyte was small, the battery of Comparative Example 4 had a smaller capacity and a shorter cycle life than those of the battery of Example 1.

In Example 5, the addition amount of Zn was intermediate between Example 1 and Comparative Example 4, and the battery performance was also intermediate between them. In Comparative Example 3, the addition amount of Zn was too small, so the Zn addition effect was little. In Example 4, the addition amount of Zn was increased from that in Comparative Example 3, and the battery performance was improved by the Zn addition effect.

As described above, the battery capacity reduced both when the Zn amount was too small and too large. Letting $Mg(x).Zn(y).Zr(z)$ (where x, y, and z are wt % and $x+y+z=100$) be the composition of the negative electrode active material except for Ni, an addition amount y of Zn preferably satisfies $1<y<15$ wt %, and more preferably $2<y<10$ wt %.

Battery Characteristics in Examples 6 and 7 and Comparative Examples 5 and 6 (Zr Addition Effect)

In Table 3, the amount of Zr in Comparative Example 6 was much larger than that in Example 1 according to the present invention. Letting $Mg(x).Zn(y).Zr(z)$ (where x, y, and z are wt % and $x+y+z=100$) be the composition of the negative electrode active material except for Ni, $z/(x+y+z)=$ 0.01 in Example 1, whereas $z/(x+y+z)=0.1$ in Comparative Example 6, i.e., the Zr amount was larger.

As can be seen from Table 3, the battery characteristics were such that the battery capacity was much lower than that in Example 1, and the battery was difficult to activate. To explicate this reason, the batteries of Example 1 and Comparative Example 6 were disassembled after 50 cycles of discharge, and SEM photographs of the negative electrode active materials were observed. Consequently, as described previously, the negative electrode active material of the battery of Example 1 had a fine grain size of 2 to 25 μm and an average grain size of 12 μm, i.e., had a relatively uniform grain size. In contrast, the negative electrode active material of the battery of Comparative Example 6 had a fine grain size of 0.1 to 27 μm and an average grain size of about 10 μm. That is, the fine grain size varied to a large degree, and many very fine grains existed probably because the amount of Zr was large. Also, XRD analysis indicated that the surfaces of many fine grains were covered with a dense film of Zr oxide.

This dense Zr oxide film transmits oxygen gas well, but has low transmittance to hydrogen gas. Therefore, the hydrogen storage amount did not increase probably because activation was difficult to achieve with this negative electrode active material. Consequently, the battery of Comparative Example 6 was difficult to activate presumably because the capacity was lower than that of the battery of Example 1.

In Example 7, the Zr addition amount was intermediate between Example 1 and Comparative Example 6, and the battery capacity was also intermediate between them. In Comparative Example 5, no Zr addition effect was achieved because the addition amount of Zr was too small. In Example 6, the battery capacity was increased by increasing the Zr addition amount from that in Comparative Example 5. As described above, the battery capacity was reduced both when the Zr amount was too small and too large. Letting $Mg(x).Zn(y).Zr(z)$ (where x, y, and z are wt % and $x+y+z=$ 100) be the composition of the negative electrode active material except for Ni, an addition amount z of Zr preferably satisfies $0.01<z<5$ wt %, and more preferably $0.1<z<3$ wt %.

In Comparative Example 7 shown in Table 3, neither Zn nor Zr was added, and the amounts of Mg and Ni were set to the same amounts in Example 1 according to the present invention. The battery characteristics were such that the initial discharge capacity was as high as 700 mAh/g, but the cycle life immediately deteriorated, i.e., the discharge capacity in the 5th cycle reduced to 10 mAh/g. This result is consistent with the report of the prior art (37th Battery Symposium in Japan, p. 389, 1996).

From the foregoing, when small amounts of Zn and Zr are added to the Mg-based hydrogen storage alloy of the negative electrode to improve the battery characteristics, the battery characteristics deteriorate both when the addition amounts are too large and too small. That is, optimum values of the addition amounts exist to obtain the best battery characteristics.

More specifically, letting $Mg(x).Zn(y).Zr(z)$ (where x, y, and z are wt % and $x+y+z=100$) be the composition of the negative electrode active material except for Ni, this composition ratio $(Mg(x).Zn(y).Zr(z))$ satisfies preferably $80<x<96$ wt %, $1<y<15$ wt %, and $0.01<z<5$ wt %, and more preferably $85<x<92$ wt %, $2<y<10$ wt %, and $0.1<z<3$ wt %.

Also, the weight ratio of the Ni powder to the (Mg(x).Zn(y).Zr(z)) mixed powder is preferably 0.2 to 3.0, and more preferably 0.4 to 2.6.

As has been described above, the present invention can provide an Ni-hydrogen alkali secondary battery which has a high capacity, suppresses the progress of fine powder formation, and has a long cycle life by using an alloy powder containing Ni, Mg, Zn, and Zr and which is capable of electrochemically storing and releasing hydrogen as a negative electrode active material.

The present invention can also provide an Mg-based negative electrode active material used in the above-mentioned high capacity, long cycle life secondary battery, a method of manufacturing the same, and a hydrogen storage alloy electrode.

What is claimed is:

1. An Mg-based alloy negative electrode active material used in a hydrogen storage alloy electrode of an alkali secondary battery consisting essentially of an amorphous alloy containing Ni, Mg, Zn, and Zr and capable of electrochemically storing and releasing hydrogen, wherein a ratio of an Ni weight to a total weight of Mg, Zn, and Zr is 0.2 to 3.0, and wherein letting Mg(x).Zn(y).Zr(z) be a composition of Mg, Zn, and Zr except for Ni, the weight distribution x:y:z satisfies the conditions:

$80<x<96$ wt %, $1<y<15$ wt %, and $0.01<z<5$ wt % (where $x+y+z=100$).

2. The material according to claim 1, wherein the ratio of Ni weight to the total weight of Mg, Zn, and Zr is 0.4 to 2.6.

3. The material according to claim 1, wherein the weight distribution x:y:z satisfies the conditions:

$85<x<92$ wt %, $2<y<10$ wt %, and $0.1<z<3$ wt %.

4. A method of manufacturing an Mg-based alloy negative electrode active material comprising the steps of:

placing powders of Ni, Mg, Zn, and Zr in a vessel; and adjusting said powders by mechanically mixing and grinding said powders.

5. The method according to claim 4, wherein said powders are adjusted by mechanically mixing and grinding said powders in an atmosphere selected from the group consisting of an inert gas and an inert gas containing hydrogen gas at a reduced pressure of not more than 0.5 atm.

6. The method according to claim 4, or 5, further comprising the steps of:

heating said powders at a temperature of 200 to 700° C. for 0.5 to 20 hr after said powders are adjusted by the mechanical mixing and grinding; and cooling said powders after said heating step.

7. A hydrogen storage alloy electrode of an alkali secondary battery having a negative electrode active material layer, wherein said negative electrode active material layer is formed by using an Mg-based alloy negative electrode active material according to claim 1.

8. An alkali secondary battery comprising:

a negative electrode made of a hydrogen storage alloy electrode formed by using an Mg-based alloy negative electrode active material according to claim 1;

a positive electrode containing a metal oxide as a main constituent material;

an alkali electrolyte; and a separator.

* * * * *